(12) United States Patent
Li et al.

(10) Patent No.: US 12,346,562 B2
(45) Date of Patent: Jul. 1, 2025

(54) NON-VOLATILE MEMORY BITMAP FOR GARBAGE COLLECTION

(71) Applicant: Western Digital Technologies, Inc., San Jose, CA (US)

(72) Inventors: Liang Li, Shanghai (CN); Xuan Tian, Shanghai (CN); Ming Wang, Shanghai (CN); Jiahui Yuan, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 41 days.

(21) Appl. No.: 18/454,253

(22) Filed: Aug. 23, 2023

(65) Prior Publication Data
US 2025/0068327 A1    Feb. 27, 2025

(51) Int. Cl.
*G06F 3/06*    (2006.01)

(52) U.S. Cl.
CPC .......... *G06F 3/0608* (2013.01); *G06F 3/0652* (2013.01); *G06F 3/0679* (2013.01)

(58) Field of Classification Search
CPC ..... G06F 3/0608; G06F 3/0652; G06F 3/0679
See application file for complete search history.

(56) References Cited

U.S. PATENT DOCUMENTS

| | | | |
|---|---|---|---|
| 5,592,669 A * | 1/1997 | Robinson | G06F 12/0638 |
| | | | 711/E12.083 |
| 7,669,003 B2 | 2/2010 | Sinclair et al. | |
| 9,489,296 B1 | 11/2016 | Tomlin et al. | |
| RE46,446 E | 6/2017 | Lasser | |
| 10,073,735 B1 * | 9/2018 | Cai | G06F 11/1048 |
| 10,838,859 B2 | 11/2020 | Saxena et al. | |
| 11,048,643 B1 * | 6/2021 | Lercari | G06F 12/0246 |
| 11,894,060 B2 * | 2/2024 | Manwani | G06F 3/0679 |
| 2007/0300037 A1 | 12/2007 | Rogers et al. | |
| 2013/0223147 A1 * | 8/2013 | Kwak | G11C 16/107 |
| | | | 365/185.11 |
| 2022/0342812 A1 * | 10/2022 | Cariello | G06F 12/0882 |
| 2024/0020226 A1 * | 1/2024 | Yim | G06F 12/0246 |
| 2024/0143211 A1 * | 5/2024 | Na | G06F 3/0644 |
| 2024/0311015 A1 * | 9/2024 | Hwang | G06F 3/061 |

OTHER PUBLICATIONS

Yoo, Ho-Nam, et al., "First Demonstration of 1-bit Erase in Vertical NAND Flash Memory," IEEE Symposium on VLSI Technology and Circuits Digest of Technical Papers, downloaded Dec. 1, 2022, 2 pages.

* cited by examiner

*Primary Examiner* — Sean D Rossiter
(74) *Attorney, Agent, or Firm* — Pearl Cohen Zedek Latzer Baratz LLP

(57) ABSTRACT

Technology for managing non-volatile memory. A bitmap may be maintained in NAND memory cells. The bits in the bitmap map to an address (e.g., PBA) in the NAND memory cells. Each bit has either a first value to indicate that the corresponding address stores valid data or a second value to indicate that the corresponding address does not store value data. Garbage collection may be performed based on the bitmap. Bit-level memory operations are performed to maintain the bitmap. Bit-level erase may be performed to erase a memory cell to have a value that indicates a valid/invalid status. The bitmap may contain unencoded data. In one aspect, a one's complement to the bitmap is stored in the NAND memory cells. The one's complement has opposite values as the regular bitmap. The system may compare the values in the regular bitmap and the one's complement bitmap for data integrity.

16 Claims, 21 Drawing Sheets

1000 ⟶

[ Maintain a bitmap in non-volatile memory cells ] — 1002

[ Perform garbage collection based on bitmap ] — 1004

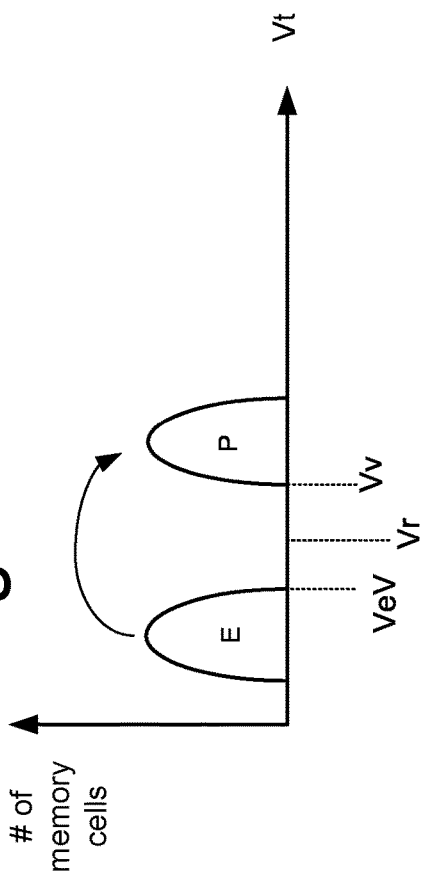
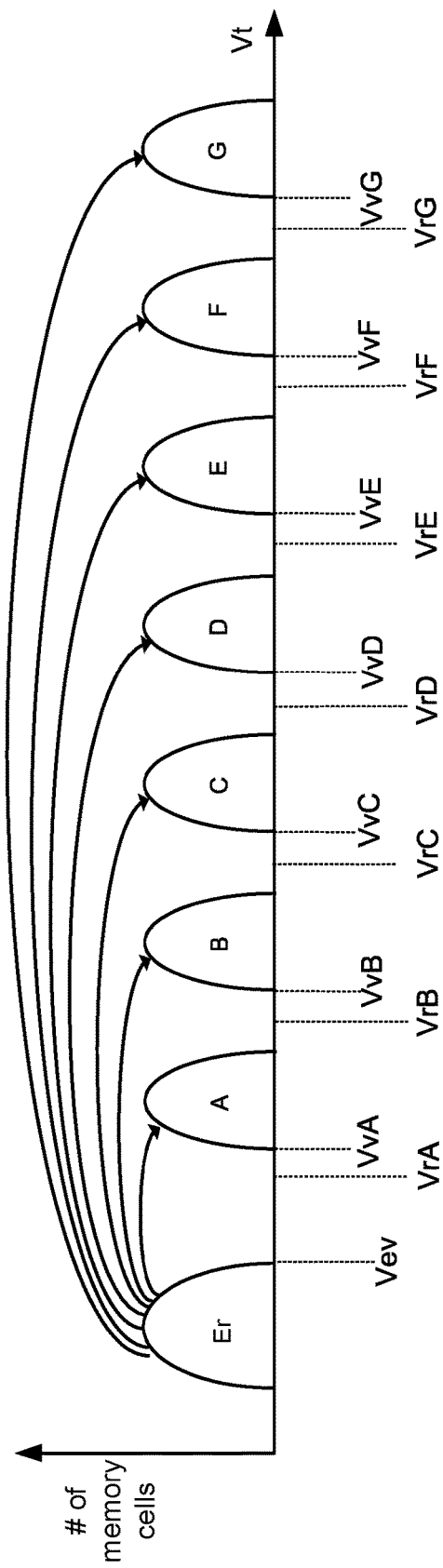

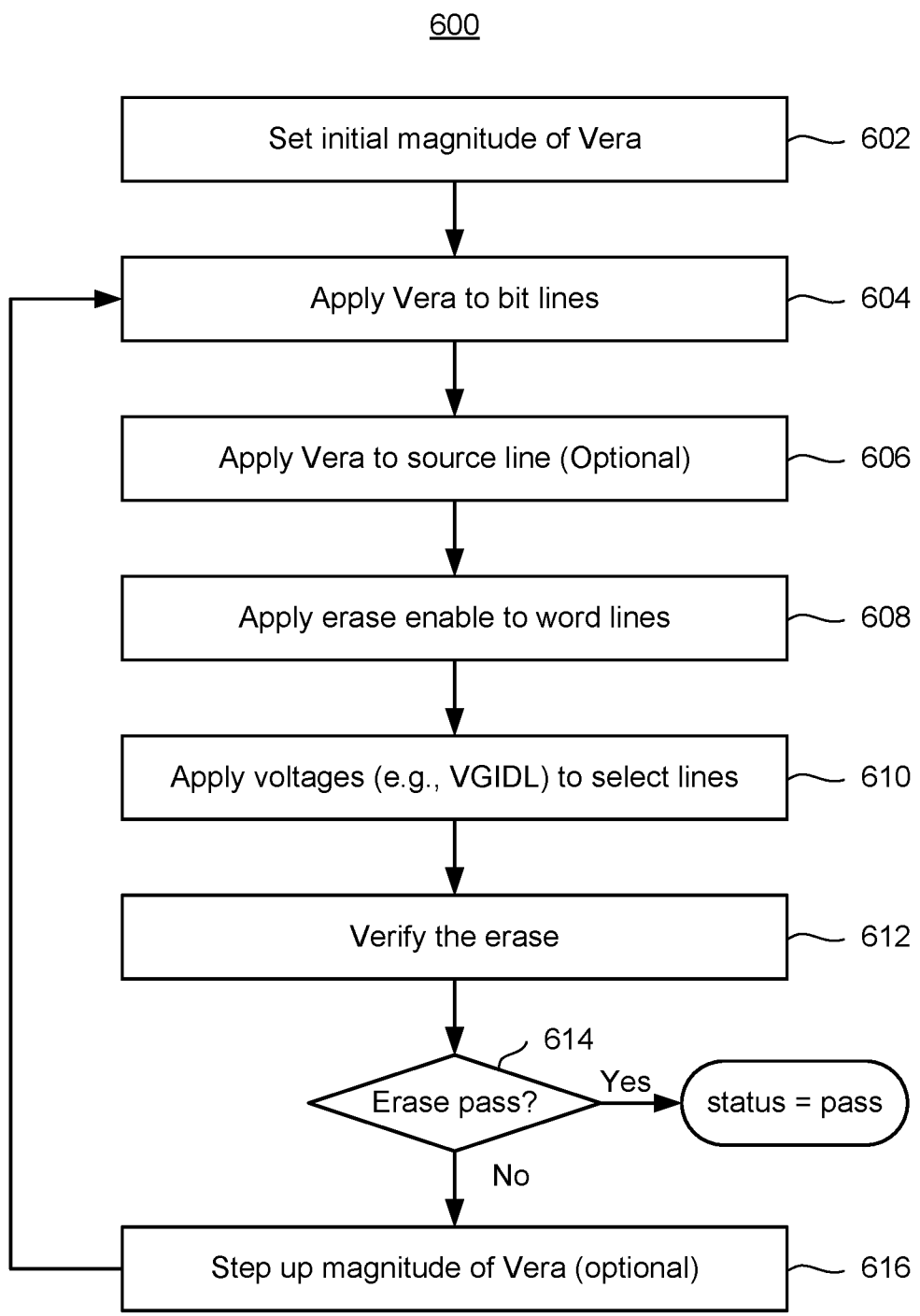

Figure 8

| DA0 | | | | | ~DA0 | | | | | DA1 | | | | | ~DA1 | | | | |
|---|---|---|---|---|---|---|---|---|---|---|---|---|---|---|---|---|---|---|---|
| B1 | B2 | ... | Bn-1 | Bn | B1 | B2 | ... | Bn-1 | Bn | B1 | B2 | ... | Bn-1 | Bn | B1 | B2 | ... | Bn-1 | Bn |
| 0 | 1 | ... | 1 | 0 | 1 | 0 | ... | 0 | 1 | 0 | 1 | ... | 1 | 0 | 1 | 0 | ... | 0 | 1 |

| | Sub-Block 0 | | Sub-Block 1 | | Sub-Block 2 | | Sub-Block 3 | | Sub-Block 4 | |
|---|---|---|---|---|---|---|---|---|---|---|
| WL0 | Blk 0 | Blk 1 | Blk 2 | Blk 3 | Blk 4 | Blk 5 | Blk 6 | Blk 7 | Blk 8 | Blk 9 |
| WL1 | Blk 10 | Blk 11 | Blk 12 | Blk 13 | Blk 14 | Blk 15 | Blk 16 | Blk 17 | Blk 18 | Blk 19 |
| WL2 | Blk 20 | Blk 21 | Blk 22 | Blk 23 | Blk 24 | Blk 25 | Blk 26 | Blk 27 | Blk 28 | Blk 29 |
| ... | ... | ... | ... | ... | ... | ... | ... | ... | ... | ... |
| WLn-2 | Blk 10*(N-2) | Blk 10*(N-2)+1 | Blk 10*(N-2)+2 | Blk 10*(N-2)+3 | Blk 10*(N-2)+4 | Blk 10*(N-2)+5 | Blk 10*(N-2)+6 | Blk 10*(N-2)+7 | Blk 10*(N-2)+8 | Blk 10*(N-2)+9 |
| WLn-1 | Blk 10*(N-1) | Blk 10*(N-1)+1 | Blk 10*(N-1)+2 | Blk 10*(N-1)+3 | Blk 10*(N-1)+4 | Blk 10*(N-1)+5 | Blk 10*(N-1)+6 | Blk 10*(N-1)+7 | Blk 10*(N-1)+8 | Blk 10*(N-1)+9 |
| WLn | Blk 10*N | Blk 10*N + 1 | Blk 10*N+2 | Blk 10*N + 3 | Blk 10*N+4 | Blk 10*N + 5 | Blk 10*N+6 | Blk 10*N + 7 | Blk 10*N+8 | Blk 10*N + 9 |

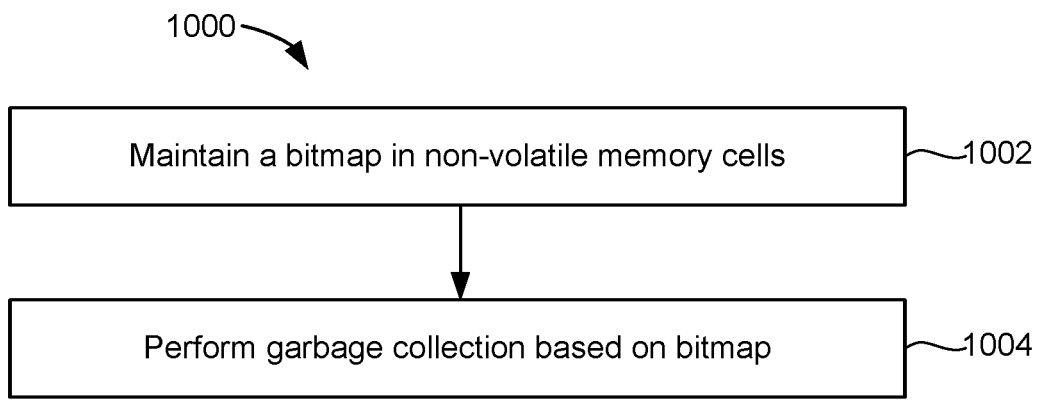
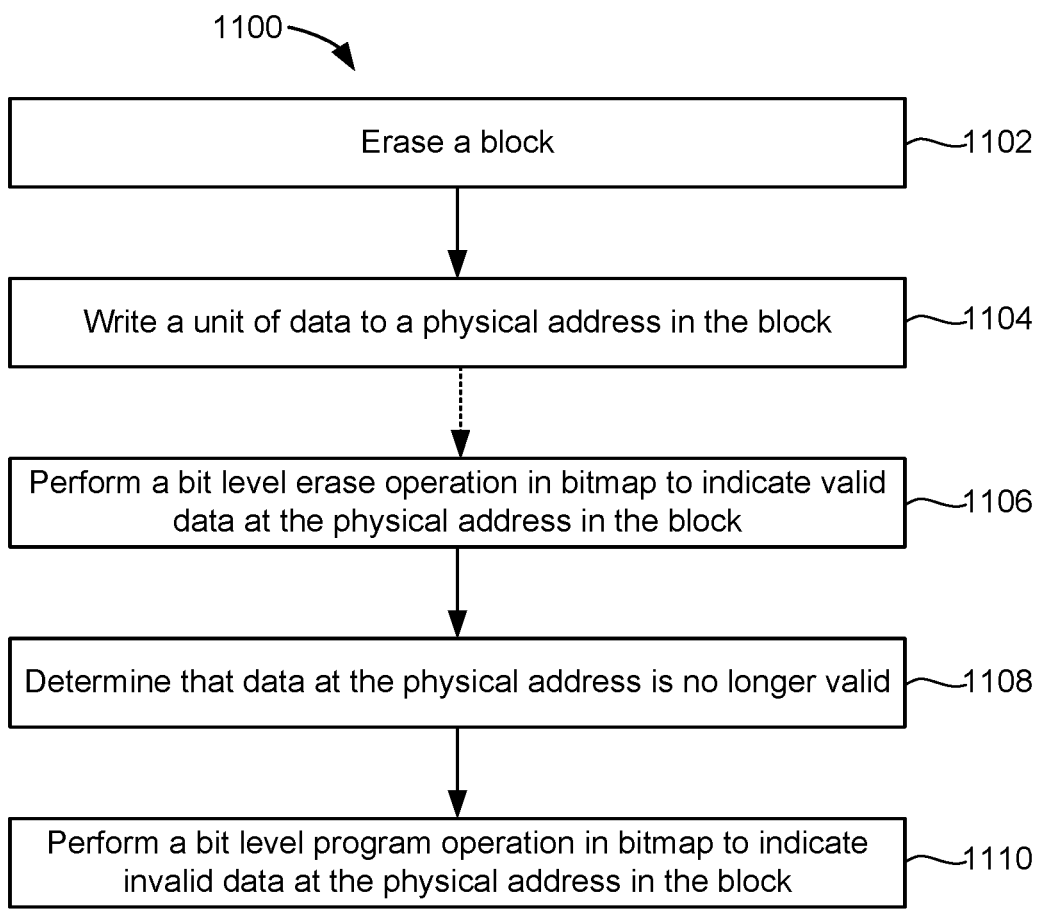

NON-VOLATILE MEMORY BITMAP FOR GARBAGE COLLECTION

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. The memory structure may be three-dimensional (3D). One type of 3D structure has non-volatile memory cells arranged as vertical NAND strings. The 3D memory structure may be arranged into units that are commonly referred to as physical blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to control gates of the memory cell transistors. In some architectures, each word line connects to the control gate of one memory cell on each NAND string in the block.

For memory such as NAND, a large set of memory cells are erased prior to programming. Herein, a set of memory cells that are erased as a unit are referred to as an "erase block." In some cases an erase block coincides with a physical block. In some cases an erase block is a portion of a physical block. Then, the memory cells within the erase block are programmed one group at a time. The non-volatile memory cells may be programmed to store data. The unit of programming is typically referred to as a page of memory cells. Typically, the memory cells are programmed to a number of data states. Using a greater number of data states allows for more bits to be stored per memory cell. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

A command from a host to will typically contain a logical address (e.g., logical block address or LBA) and a length. The logical address is an address in the host address space. The storage device will typically translate the logical address to a physical address in the storage device. For example, an LBA may be mapped to a PBA (physical block address). The PBA may represent any suitable memory segment, such as a page or partial page. A memory controller performs address translation between the logical addresses used by the host and the physical addresses used by the storage system. One example implementation is to maintain tables (e.g., L2P tables) that identify the current translation between logical addresses and physical addresses. An entry in the L2P table may include an identification of a logical address and corresponding physical address. Furthermore, the memory controller may track what PBAs contain valid data and which do not. When data is first written to a PBA the memory controller marks the PBA as containing valid data.

It is possible that the host will write new data to an LBA. However, typical NAND does not allow the data at the PBA to be overwritten with the new data without erasing the entire erase block. Therefore, the storage system will typically write the new data for the LBA to a different PBA. The memory controller then updates the L2P table to map the LBA to the new PBA. The memory controller will mark the new PBA as having valid data. Moreover, the memory controller will mark the original PBA as not containing valid data.

The foregoing may result in an erase block having more and more invalid PBAs over time. In one technique the memory controller will perform garbage collection. In some NAND techniques, garbage collection involves identifying target erase blocks having a high number of invalid PBAs. Any valid data in these target erase blocks is moved to a different block. Then, the target erase blocks may be erased such that they are available for writing new data.

The memory controller may have access to some amount of volatile memory (e.g., RAM) for management purposes such as managing the L2P tables and garbage collection. However, such volatile memory can be very limited in some storage systems. Also, such volatile memory can add considerable cost to the storage system.

BRIEF DESCRIPTION OF THE DRAWINGS

Like-numbered elements refer to common components in the different figures.

FIG. 5A depicts a threshold voltage (Vt) distributions when each memory cells stores one bit.

FIG. 5B depicts a threshold voltage (Vt) distributions when each memory cells stores three bits.

FIG. 6 is a flowchart describing one embodiment of a process for erasing memory cells.

FIG. 8 depicts one embodiment of a bitmap data structure.

FIG. 9 depicts one embodiment of an organization of a block of bitmaps.

FIG. 10 is a flowchart of one embodiment of a process of garbage collection based on a bitmap in non-volatile memory.

FIG. 11 is a flowchart of one embodiment of a process that includes maintaining a bitmap in non-volatile memory.

DETAILED DESCRIPTION

Technology is disclosed herein for managing non-volatile memory such as NAND memory. In an embodiment, a bitmap is maintained in NAND memory cells. The bitmap may have bits that map to addresses (e.g., PBAs) in the NAND memory cells. Each bit has either a first value to indicate that the corresponding address stores valid data or a second value to indicate that the corresponding address does not store value data. Garbage collection may be performed based on the bitmap. In an embodiment, bit-level memory operations are performed to maintain the bitmap. Note that bit-level memory operations may also be referred to as memory cell level memory operations. In an embodiment, a bit-level erase is performed to erase a memory cell to have a value that indicates a valid/invalid status. In an embodiment, the bitmap contains unencoded data. In one embodiment, a one's complement to the bitmap is stored in the NAND memory cells. The one's complement has opposite values as the regular bitmap. The system may compare the values in the regular bitmap and the one's complement bitmap for data integrity. The bitmap reduces the need for volatile memory such as RAM in the storage device. Therefore, the bitmap reduces cost by reducing the amount of expensive volatile memory.

Figure 1:
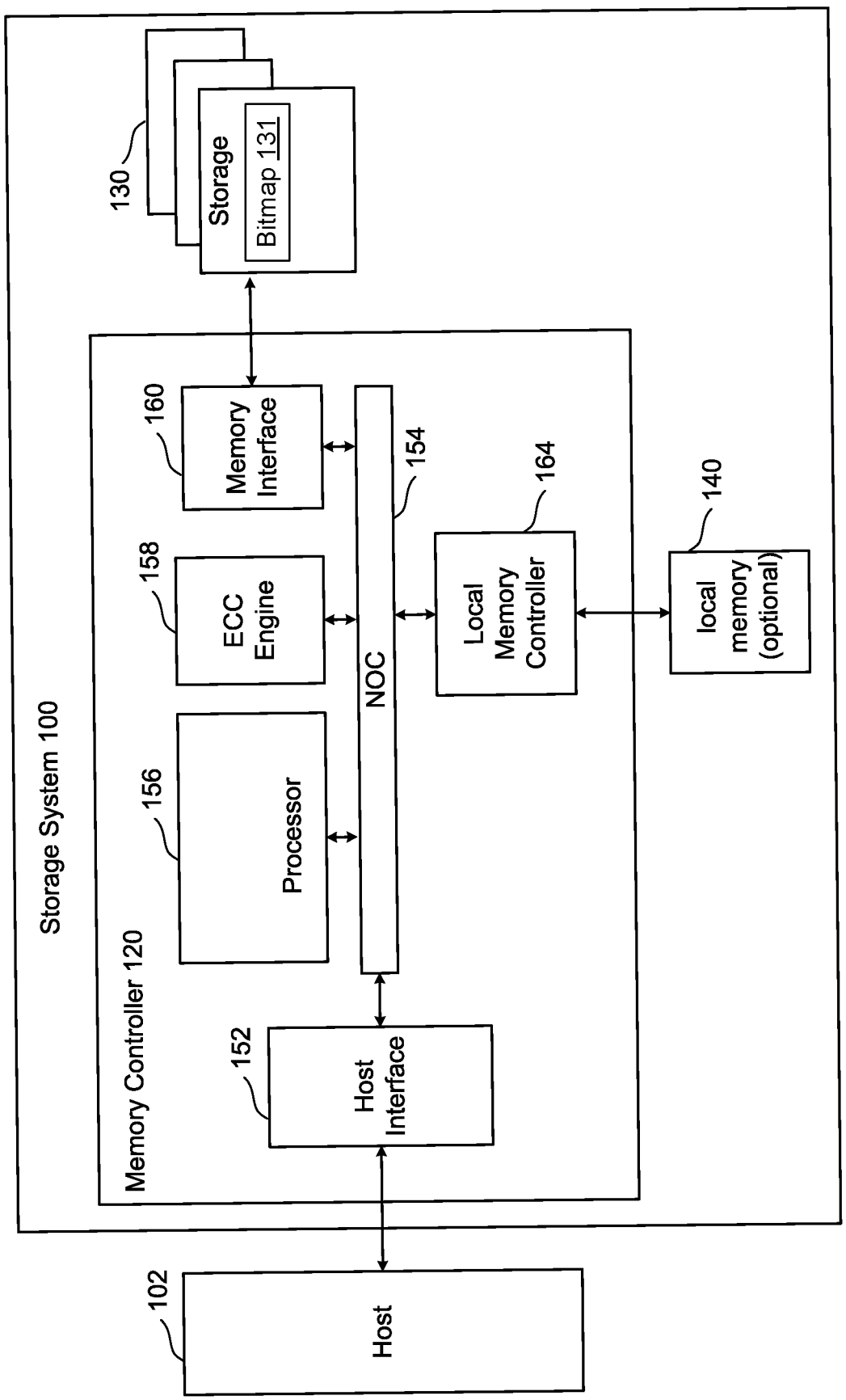
FIG. 1 is a block diagram depicting one embodiment of a storage system.

FIG. 1 is a block diagram of one embodiment of a storage system 100 that implements the technology described herein. In an embodiment, the storage system 100 is configured to maintain a bitmap 131 in storage 130. In an embodiment, the bitmap 131 is maintained in NAND memory cells. The storage system 100 may perform garbage collection in the storage 130 based on the bitmap 131.

In one embodiment, storage system 100 is a solid state drive ("SSD"). Storage system 100 may be referred to as a "non-volatile storage system." Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and optional local high speed memory 140 (e.g., DRAM, SRAM, MRAM). Note that local high speed memory 140 is optional. Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with one or more memory die in storage 130. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140. The memory controller 120 may also issue commands to the storage 130 to maintain the bitmap 131. In an embodiment, the commands include a bit-level erase and a bit-level program. In an embodiment, the memory controller 120 performs garbage collection based on the bitmap 131.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
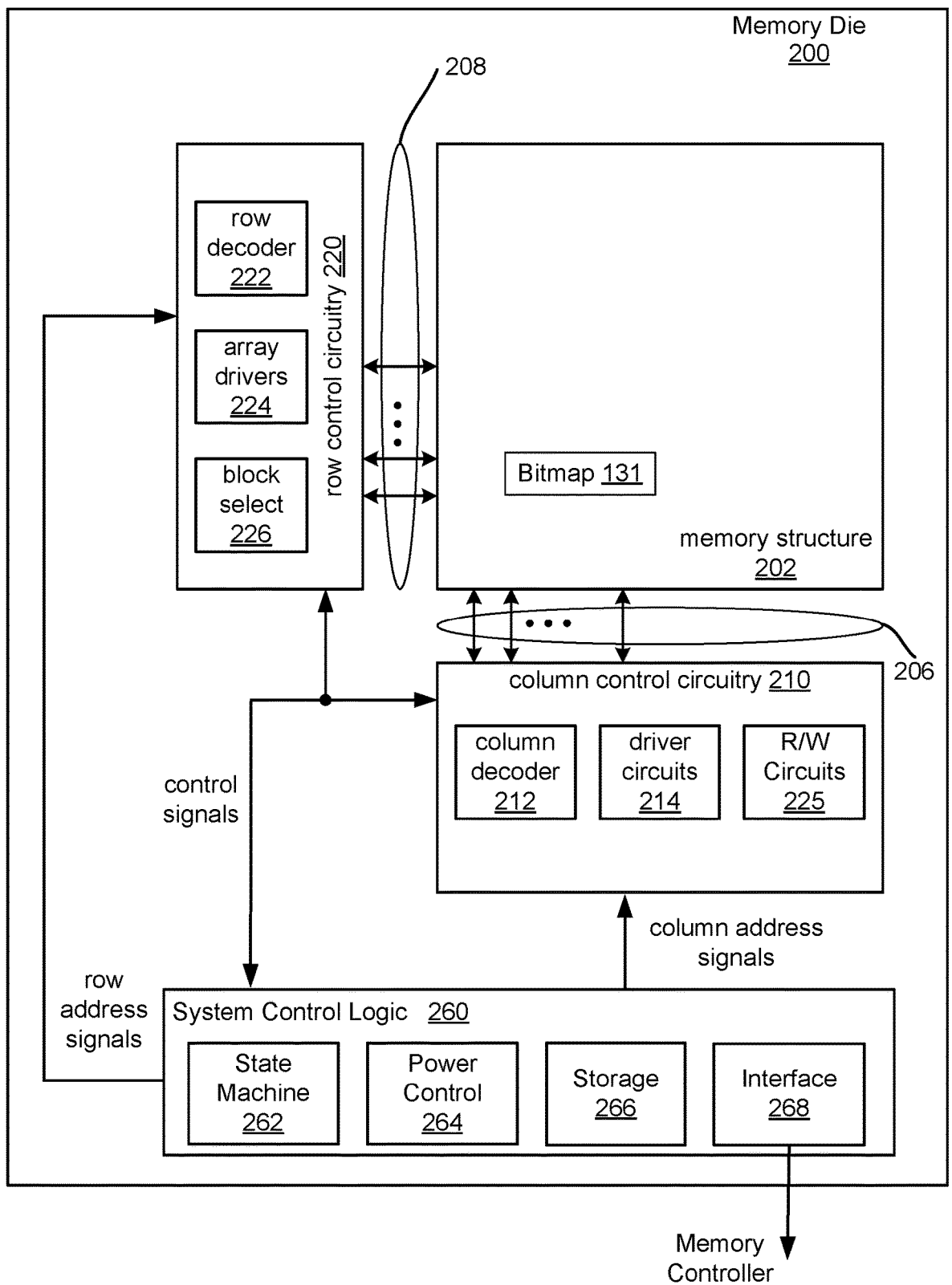
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. A bitmap 131 may be stored in non-volatile memory cells in the memory structure 202. The bitmap 131 may have bits that map to addresses (e.g., PBAs) in the memory structure 202. Each bit has either a first value to indicate that memory cells at the corresponding address store valid data or a second value to indicate that the memory cells at the corresponding address do not store value data. Garbage collection may be performed based on the bitmap 131. In some embodiments, more than one version of the bitmap 131 is stored in the memory structure 202. There may be a regular bitmap and a one's complement bitmap that has opposite values as the regular bitmap. There may be multiple copies of the regular bitmap. The additional versions of the bitmap may be used for data integrity. Note that in some embodiments, the bitmap 131 contains unencoded data. That is, in contrast to a typical process of encoding the user data as an ECC codeword prior to storage in the memory structure 202, it is not required that ECC codewords be used in the bitmap 131. In some embodiments, the bitmap 131 is maintained using bit-level memory operations such as a bit-level erase operation.

The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only a single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, as well as read/write circuitry 225, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used. In one embodiment, the memory die 200 receives a command via memory controller interface 268 to perform a bit-level erase. The bit-level erase may be used to maintain the bitmap 133. The bit-level erase command may indicate what memory cells in the bitmap 131 are to be erased and what memory cells in the bitmap 131 are to be inhibited from erase. Note that the entire bitmap 131 may reside within an erase block. Erase blocks may typically be erased as a unit if the erase block is used for storing user data.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
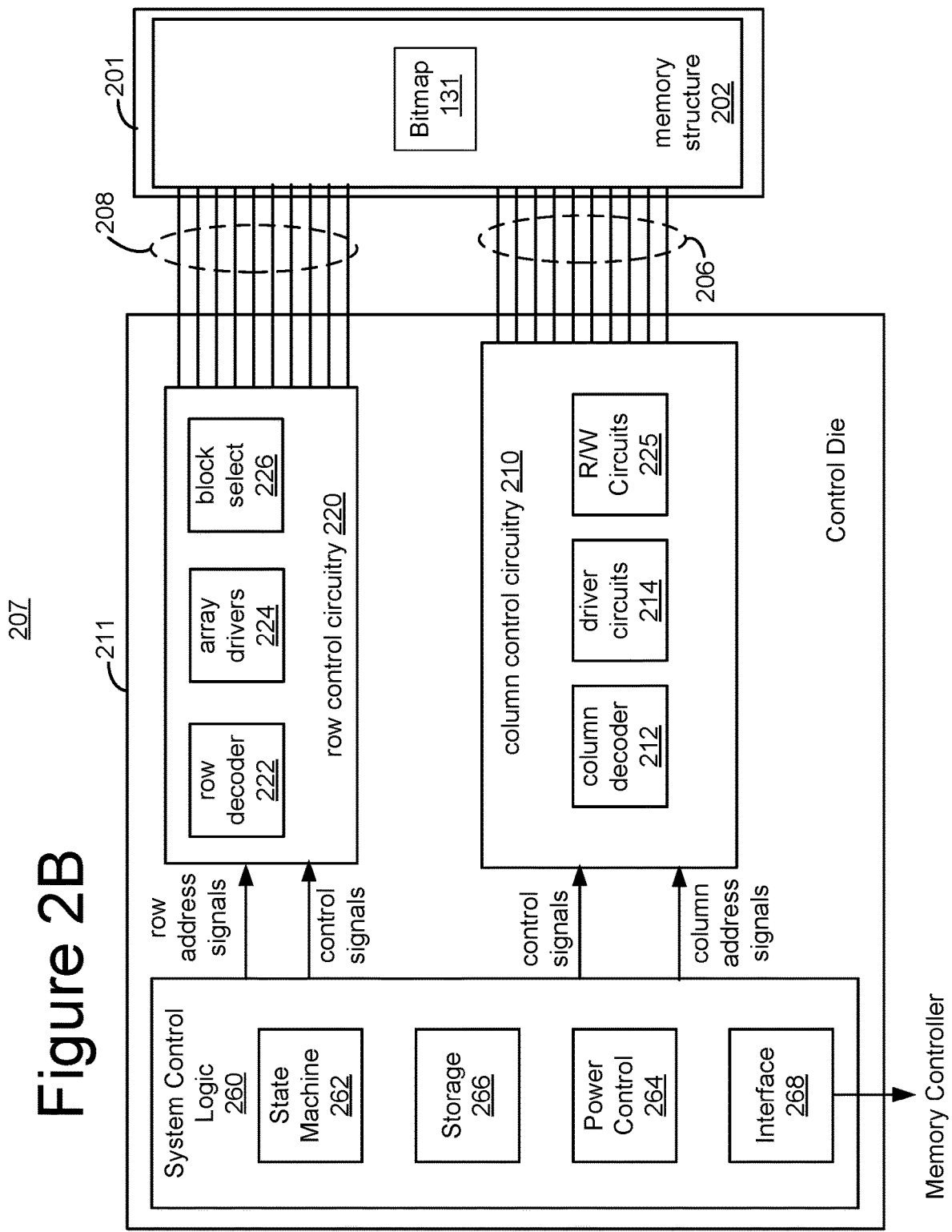
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and R/W circuits 225 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include, but is not limited to, any one of or any combination of state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, storage 130, memory die 200, integrated memory assembly 207, and/or control die 211.

Figure 3A:
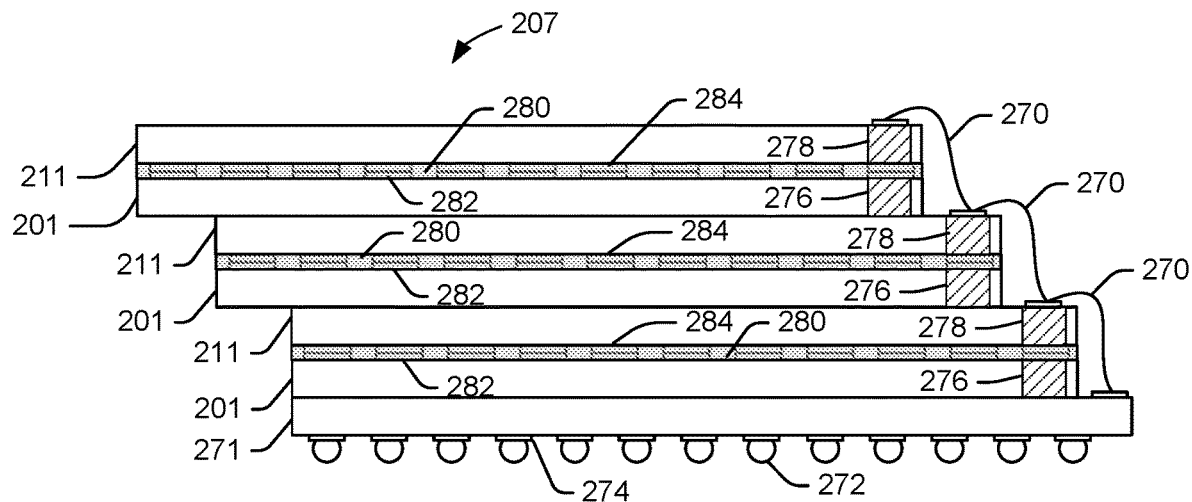
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
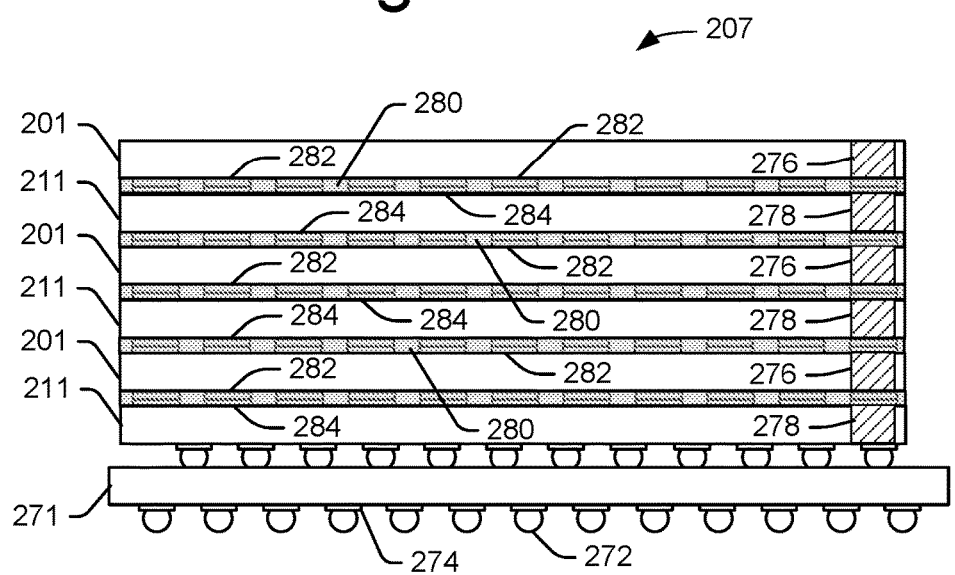

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 3C:
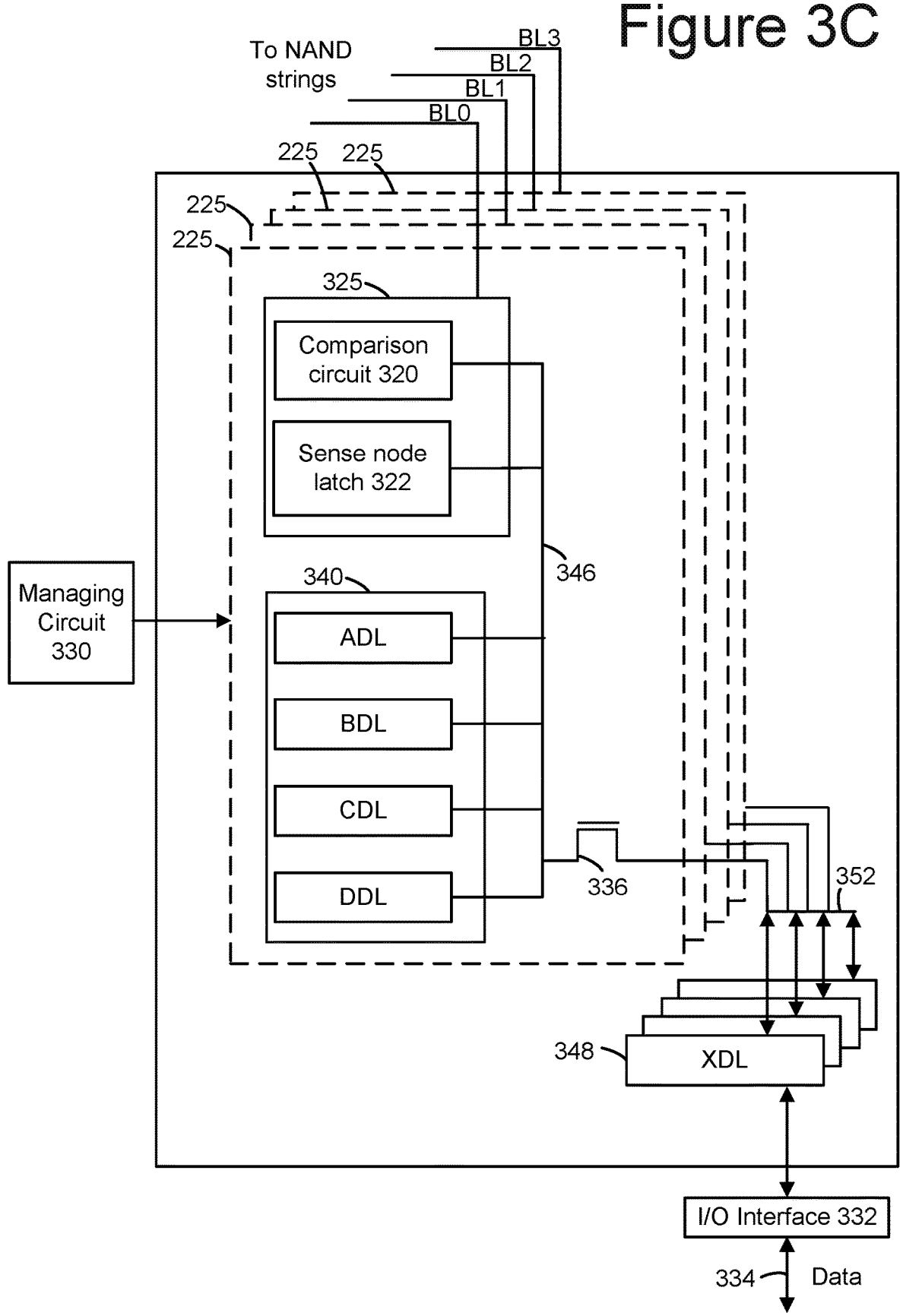
FIG. 3C is a block diagram depicting one embodiment of a portion of column control circuitry that contains a number of read/write circuits.

FIG. 3C is a block diagram depicting one embodiment of a portion of column control circuitry 210 that contains a number of read/write circuits 225. Each read/write circuit 225 is partitioned into a sense amplifier 325 and data latches 340. A managing circuit 330 controls the read/write circuits 225. The managing circuit 330 may communicate with state machine 262. In one embodiment, each sense amplifier 325 is connected to a respective bit line. Each bit line may be connected, at one point in time, to one of a large number of different NAND strings. A select gate on the NAND string may be used to connect the NAND string channel to the bit line.

Each sense amplifier 325 operates to provide voltages to one of the bit lines (see BL0, BL1, BL2, BL3) during program, verify, erase, and read operations. Sense amplifiers are also used to sense the condition (e.g., data state) of a memory cell in a NAND string connected to the bit line that connects to the respective sense amplifier.

Each sense amplifier 325 may have a sense node. During sensing, a sense node is charged up to an initial voltage, Vsense_init, such as 3V. The sense node is then connected to the bit line for a sensing time, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state. In an embodiment, the sense node has a capacitor that is pre-charged and then discharged for the sensing time.

In particular, the comparison circuit 320 determines the amount of decay by comparing the sense node voltage to a trip voltage after the sensing time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the verify voltage. A sense node latch 322 is set to 0 or 1, for example, by the comparison circuit 320 based on whether the memory cell is in a conductive or non-conductive state, respectively. The bit in the sense node latch 322 can also be used in a lockout scan to decide whether to set a bit line voltage to an inhibit or a program enable level in a next program loop. The bit in the sense node latch 322 can also be used in a lockout mode to decide whether to set a bit line voltage to a sense voltage or a lockout voltage in a read operation.

The data latches 340 are coupled to the sense amplifier 325 by a local data bus 346. The data latches 340 include four latches (ADL, BDL, CDL, DDL) for each sense amplifier 325 in this example. More or fewer than four latches may be included in the data latches 340. In one embodiment, for programming each data latch 340 is used to store one bit to be stored into a memory cell and for reading each data latch 340 is used to store one bit read from a memory cell. In a four bit per memory cell embodiment, ADL stores a bit for a lower page of data, BDL stores a bit for a middle page of data, CDL stores a bit for an upper page of data, and DDL store a bit for a top page of data. Each read/write circuit 225 is connected to an XDL latch 348 by way of an XDL bus 352. In this example, transistor 336 connects local data bus 346 to XDL bus 352. An I/O interface 332 is connected to the XDL latches 348. The XDL latch 348 associated with a particular read/write circuit 225 serves as an interface latch for storing/latching data from the memory controller 120.

Managing circuit 330 performs computations, such as to determine the data stored in the sensed memory cell and store the determined data in the set of data latches. Each set of data latches 340 is used to store data bits determined by managing circuit 330 during a read operation, and to store data bits imported from the data bus 334 during a program operation which represent write data meant to be programmed into the memory. I/O interface 332 provides an interface between XDL latches 348 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to managing circuit 330. At that point, managing circuit 330 determines the resultant memory state by consideration of the tripping event(s) of the sense circuit and the information about the applied control gate voltage from the state machine. It then computes a binary encoding for the memory state and stores the resultant data bits into data latches 340.

During program or verify operations for memory cells, the data to be programmed (write data) is stored in the set of data latches 340 from the data bus 334 by way of XDL latches 348. The program operation, under the control of the state machine 262, applies a series of programming voltage pulses to the control gates of the addressed memory cells. Each voltage pulse may be stepped up in magnitude from a previous program pulse by a step size in a process referred to as incremental step pulse programming. In one embodiment, each program voltage is followed by a verify operation to determine if the memory cells have been programmed to the desired memory state. In some cases, managing circuit 330 monitors the read back memory state relative to the desired memory state. When the two agree, managing circuit 330 sets the bit line in a program inhibit mode such as by updating its latches. This inhibits the memory cell coupled to the bit line from further programming even if additional program pulses are applied to its control gate.

Figure 4:
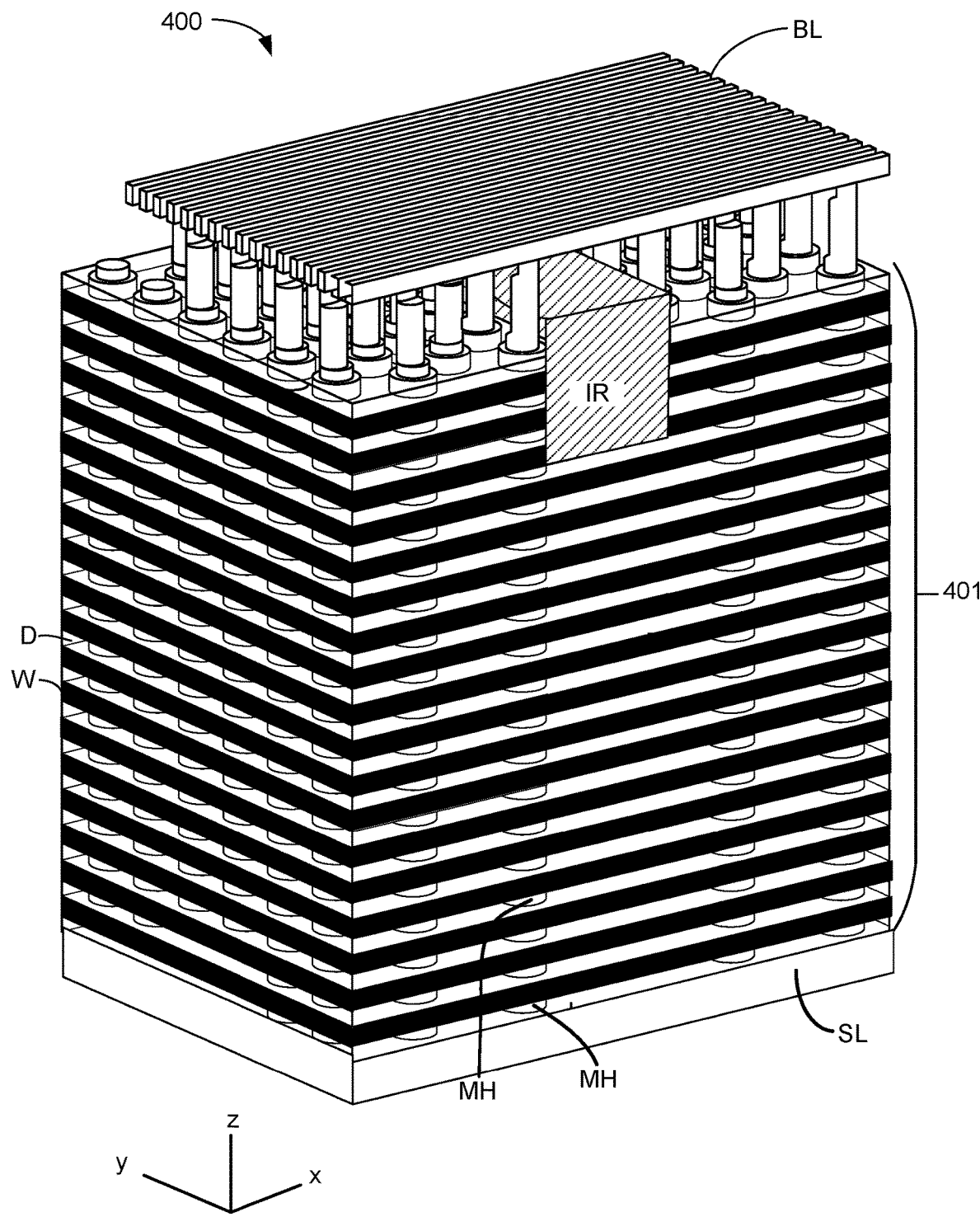
FIG. 4 is a perspective view of a portion of one example of a monolithic three dimensional memory structure.

FIG. 4 is a perspective view of a portion of one example of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
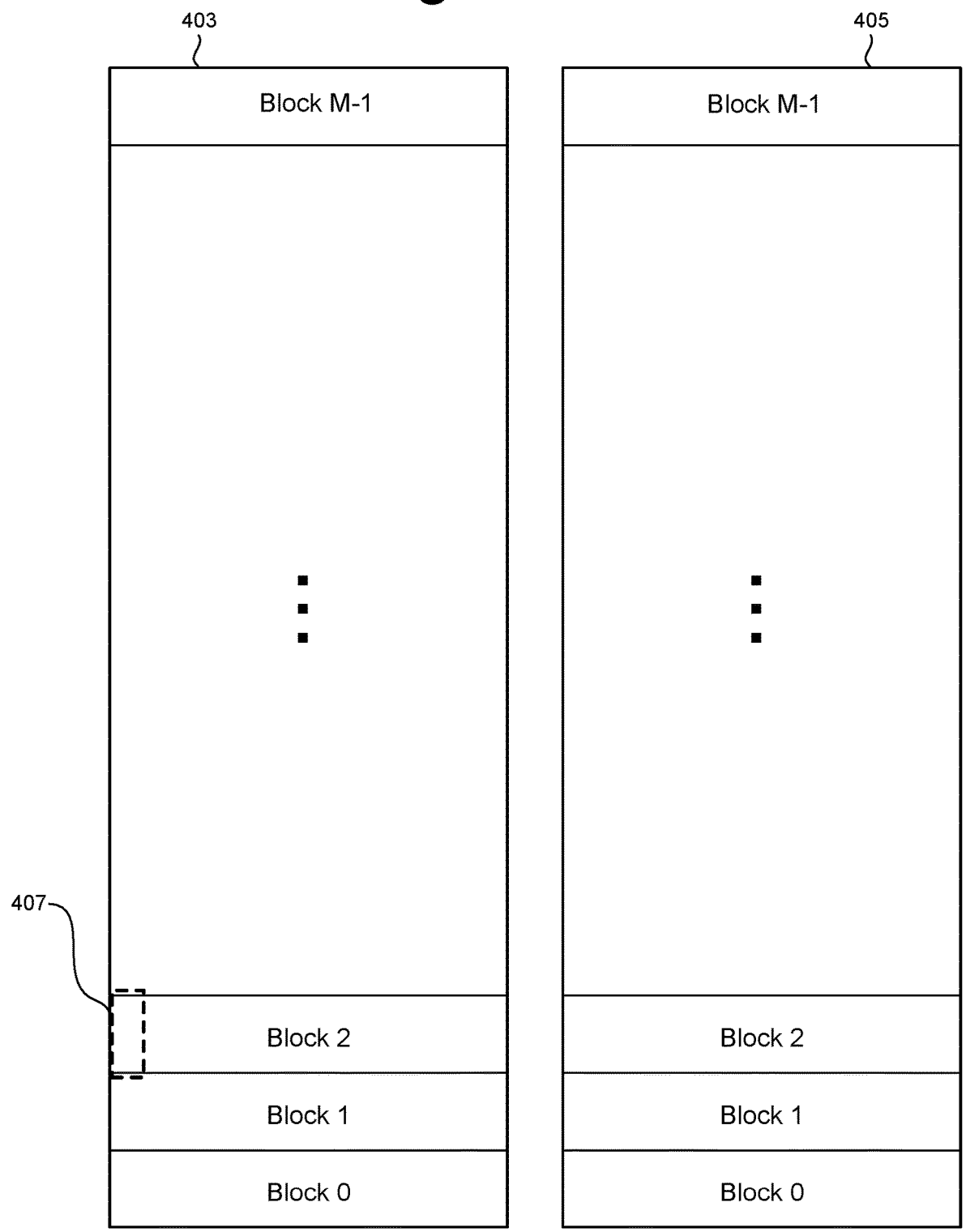
FIG. 4A is a block diagram of one example of a memory structure having two planes.

FIG. 4A is a block diagram explaining one example organization of memory structure 202, which is divided into two planes 403 and 405. Each plane is then divided into M physical blocks. In one example, each plane has about 2000 physical blocks. However, different numbers of physical blocks and planes can also be used. In one embodiment, a physical block of memory cells is a unit of erase. That is, all memory cells of a physical block are erased together. In other embodiments, physical blocks can be divided into sub-blocks and the sub-blocks can be the unit of erase. Memory cells can also be grouped into physical blocks for other reasons, such as to organize the memory structure to enable the signaling and selection circuits. In some embodiments, a physical block represents a group of connected memory cells as the memory cells of a block share a common set of word lines. For example, the word lines for a physical block are all connected to all of the vertical NAND strings for that physical block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 4B:
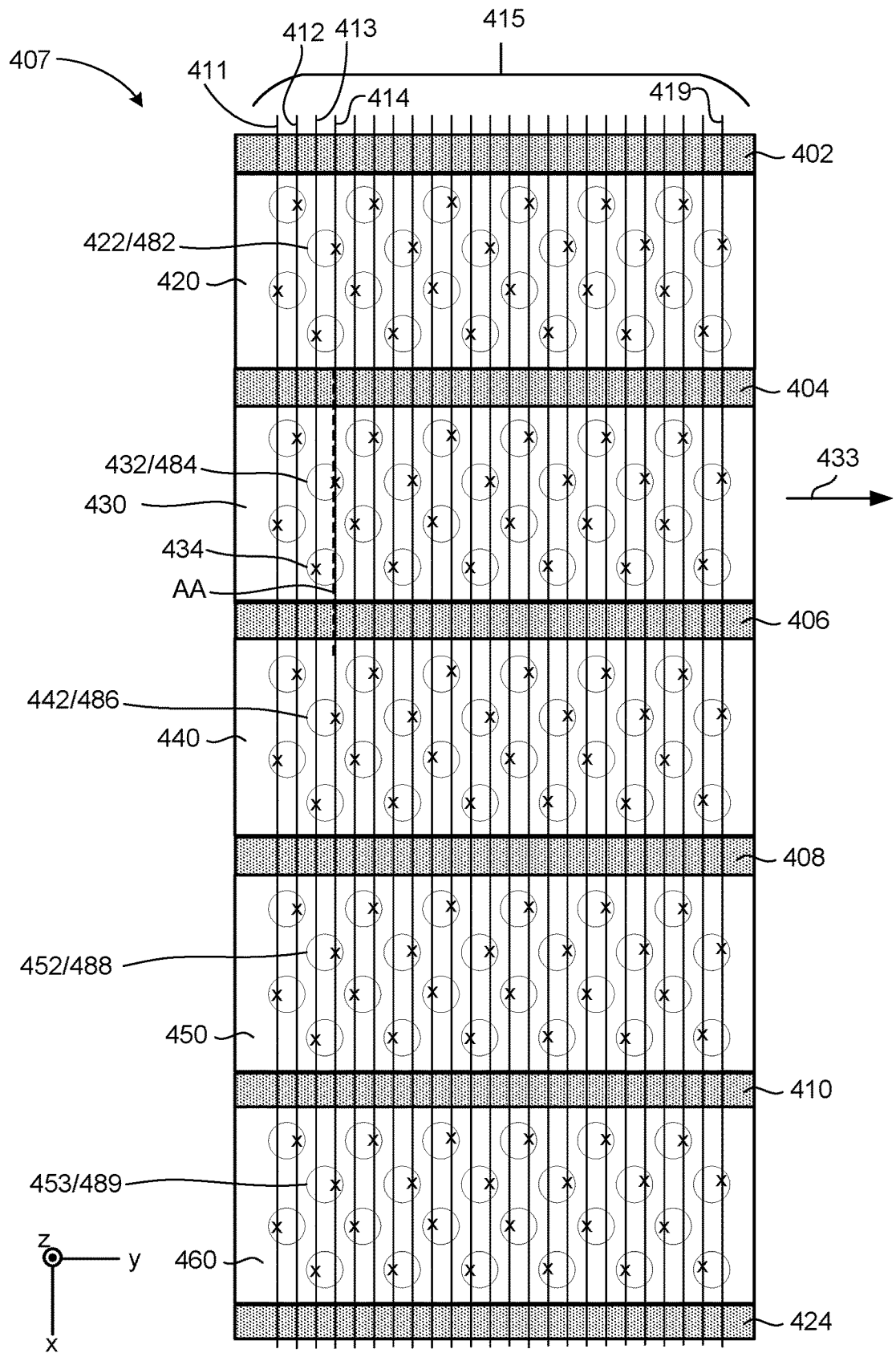
FIG. 4B is a block diagram depicting a top view of a portion of physical block of memory cells.

FIGS. 4B-4E depict an example three dimensional ("3D") NAND structure that corresponds to the structure of FIG. 4 and can be used to implement memory structure 202 of FIGS. 2A and 2B. FIG. 4B is a diagram depicting a top view of a portion 407 of Block 2. As can be seen from FIG. 4B, the physical block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, 452 and 453. Vertical column 422 implements NAND string 482. Vertical column 432 implements NAND string 484. Vertical column 442 implements NAND string 486. Vertical column 452 implements NAND string 488. Vertical column 453 implements NAND string 486. Vertical column 452 implements NAND string 489. More details of the vertical columns are provided below. Since the physical block depicted in FIG. 4B extends in the direction of arrow 433, the physical block includes more vertical columns than depicted in FIG. 4B.

FIG. 4B also depicts a set of bit lines 415, including bit lines 411, 412, 413, 414, ... 419. FIG. 4B shows twenty-four bit lines because only a portion of the physical block is depicted. It is contemplated that more than twenty-four bit lines connected to vertical columns of the physical block. Each of the circles representing vertical columns has an "x" to indicate its connection to one bit line. For example, bit line 414 is connected to vertical columns 422, 432, 442 and 452.

The physical block depicted in FIG. 4B includes a set of isolation regions 402, 404, 406, 408, 410, and 424, which are formed of $SiO_2$; however, other dielectric materials can also be used. Isolation regions 402, 404, 406, 408, 410, and 424 serve to divide the top layers of the physical block into five regions; for example, the top layer depicted in FIG. 4B is divided into regions 420, 430, 440, 450, and 460 of which are referred to as sub-blocks. In one embodiment, isolation regions 402 and 424 separate the physical block 407 from adjacent physical blocks. Thus, isolation regions 402 and 424 may extend down to the substrate. In one embodiment, the isolation regions 404, 406, 408, and 410 only divide the layers used to implement select gates so that NAND strings in different sub-blocks can be independently selected. Referring back to FIG. 4, the IR region may correspond to any of isolation regions 404, 406, 408, or 410. In one example implementation, a bit line only connects to one vertical column/NAND string in each of regions (sub-blocks) 420, 430, 440, 450, and 460. In that implementation, each physical block has twenty rows of active columns and each bit line connects to five rows in each block. In one embodiment, all of the five vertical columns/NAND strings connected to a common bit line are connected to the same word line (or set of word lines); therefore, the system uses the drain side selection lines to choose one (or another subset) of the five to be subjected to a memory operation (program, verify, read, and/or erase).

Although FIG. 4B shows each region (420, 430, 440, 450, 460) having four rows of vertical columns, five regions (420, 430, 440, 450, 460) and twenty rows of vertical columns in a block, those exact numbers are an example implementation. Other embodiments may include more or fewer regions (420, 430, 440, 450, 460) per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

Figure 4C:
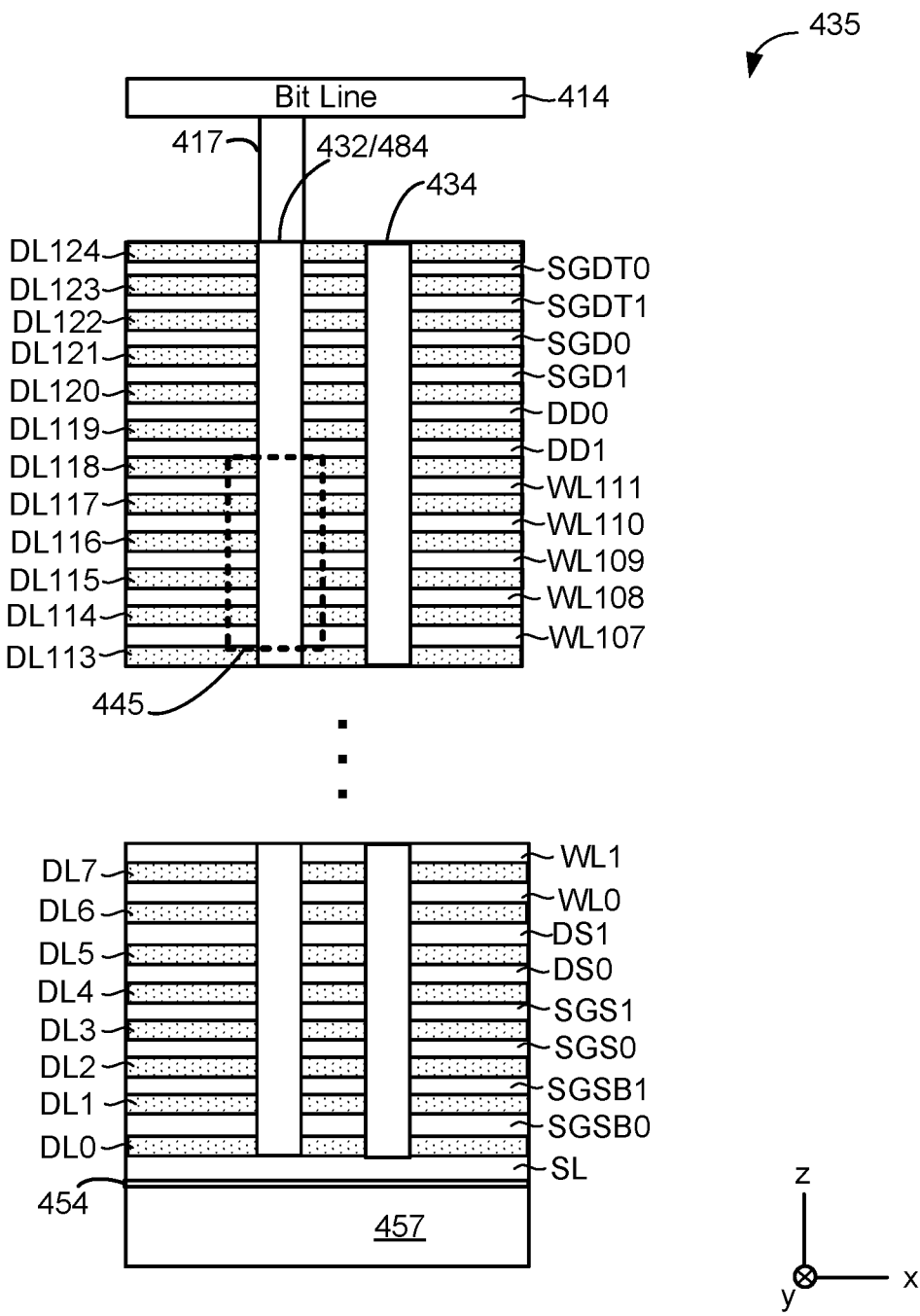
FIG. 4C depicts an example of a stack showing a cross-sectional view along line AA of FIG. 4B.

FIG. 4C depicts an example of a stack 435 showing a cross-sectional view along line AA of FIG. 4B. The SGD layers include SGDT0, SGDT1, SGD0, and SGD1. The SGD layers may have more or fewer than four layers. The SGS layers includes SGSB0, SGSB1, SGS0, and SGS1. The SGS layers may have more or fewer than four layers. Four dummy word line layers DD0, DD1, DS1, and DS0 are provided, in addition to the data word line layers WL0-WL111. There may be more or fewer than 112 data word line layers and more or fewer than four dummy word line layers. Each NAND string has a drain side select gate at the SGD layers. Each NAND string has a source side select gate at the SGS layers. Also depicted are dielectric layers DL0-DL124.

Columns 432, 434 of memory cells are depicted in the multi-layer stack. The stack includes a substrate 457, an insulating film 454 on the substrate, and a portion of a source line SL. A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 417 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD are used to electrically connect and disconnect (or cut off) the channels of respective NAND strings from bit lines. Source side select layers SGS are used to electrically connect and disconnect (or cut off) the channels of respective NAND strings from the source line SL.

Figure 4D:
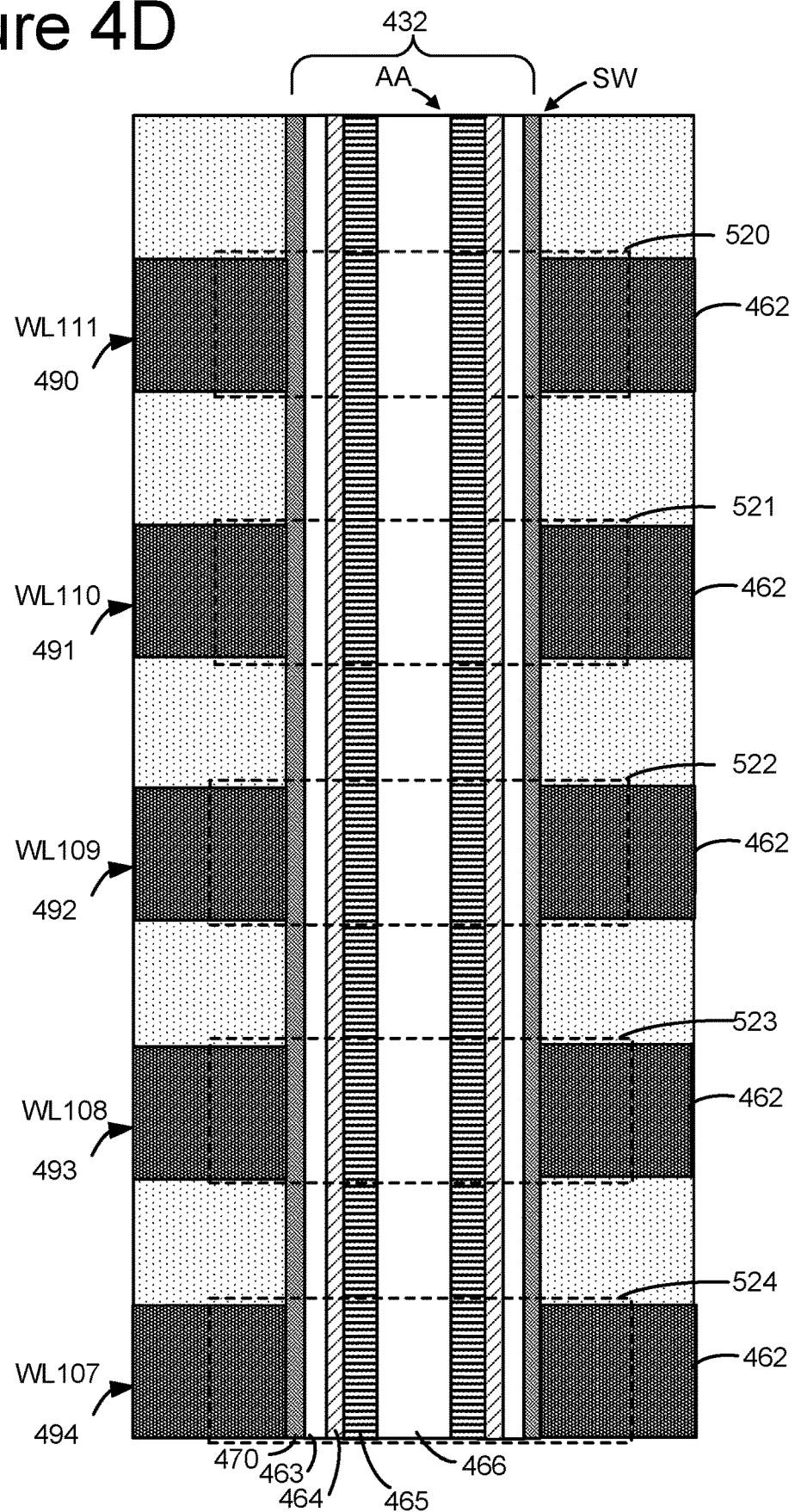
FIG. 4D depicts a view of the region 445 of FIG. 4C.

FIG. 4D depicts a view of the region 445 of FIG. 4C. Data memory cell transistors 520, 521, 522, 523, and 524 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vt of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
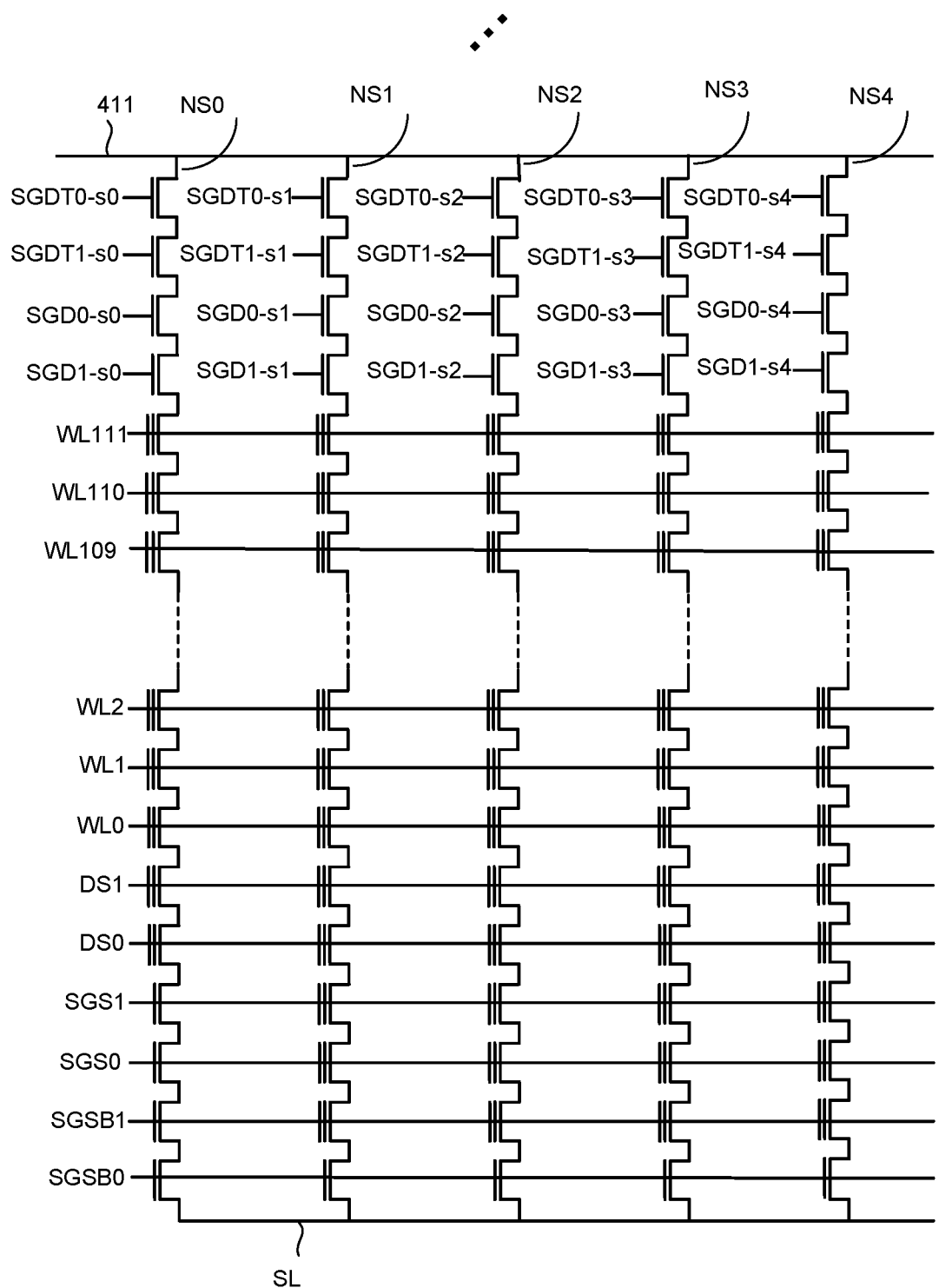
FIG. 4E is a schematic diagram of a portion of one example of a physical block, depicting several NAND strings.

FIG. 4E is a schematic diagram of a portion of the memory array 202. FIG. 4E shows physical data word lines WL0-WL111 running across the entire block. The structure of FIG. 4E corresponds to a portion 407 in Block 2 of FIG. 4A, including bit line 411. Within the physical block, in one embodiment, each bit line is connected to five NAND strings. Thus, FIG. 4E shows bit line 411 connected to NAND string NS0, NAND string NS1, NAND string NS2, NAND string NS3, and NAND string NS4.

In one embodiment, there are five sets of drain side select lines in the physical block. For example, the set of drain side select lines connected to NS0 include SGDT0-*s*0, SGDT1-*s*0, SGD0-*s*0, and SGD1-*s*0. The set of drain side select lines connected to NS1 include SGDT0-*s*1, SGDT1-*s*1, SGD0-*s*1, and SGD1-*s*1. The set of drain side select lines connected to NS2 include SGDT0-*s*2, SGDT1-*s*2, SGD0-*s*2, and SGD1- s2. The set of drain side select lines connected to NS3 include SGDT0-s3, SGDT1-s3, SGD0-s3, and SGD1-s3. The set of drain side select lines connected to NS4 include SGDT0-s4, SGDT1-s4, SGD0-s4, and SGD1-s4. Herein the term "SGD" may be used as a general term to refer to any one or more of the lines in a set of drain side select lines. In an embodiment, each line in a given set may be operated independent from the other lines in that set to allow for different voltages to the gates of the four drain side select transistors on the NAND string. Moreover, each set of drain side select lines can be selected independent of the other sets. Each set drain side select lines connects to a group of NAND strings in the block. Only one NAND string of each group is depicted in FIG. 4E. These five sets of drain side select lines correspond to five sub-blocks. A first sub-block corresponds to those vertical NAND strings controlled by SGDT0-s0, SGDT1-s0, SGD0-s0, and SGD1-s0. A second sub-block corresponds to those vertical NAND strings controlled by SGDT0-s1, SGDT1-s1, SGD0-s1, and SGD1-s1. A third sub-block corresponds to those vertical NAND strings controlled by SGDT0-s2, SGDT1-s2, SGD0-s2, and SGD1-s2. A fourth sub-block corresponds to those vertical NAND strings controlled by SGDT0-s3, SGDT1-s3, SGD0-s3, and SGD1-s3. A fifth sub-block corresponds to those vertical NAND strings controlled by SGDT0-s4, SGDT1-s4, SGD0-s4, and SGD1-s4. As noted, FIG. 4E only shows the NAND strings connected to bit line 411. However, a full schematic of the block would show every bit line and five vertical NAND strings connected to each bit line.

In one embodiment, all of the memory cells on the NAND strings in a physical block are erased as a unit. However in some embodiments, a physical block is operated as an upper tier and a lower tier, wherein the upper tier and the lower tier each form an erase block. For example, memory cells connected to WL0-WL61 may be in the lower tier and memory cells connected to WL62-WL111 may be in the upper tier. Hence, memory cells connected to WL0-WL61 may be in one erase block and memory cells connected to WL62-WL111 may be in another erase block. A physical block could be operated in more than two tiers. Erase blocks can be formed based on other divisions of physical blocks.

Although the example memories of FIGS. 4-4E are three dimensional memory structure that includes vertical NAND strings with charge-trapping material, other 3D memory structures can also be used with the technology described herein.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. Memory cells that store multiple bits per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine whether a memory cell is erased (state E) or programmed (state P). FIG. 5A also depicts a verify reference voltage Vv. In some embodiments, when programming memory cells to data state P, the system will test whether those memory cells have a threshold voltage greater than or equal to Vv. In some embodiments, when programming memory cells to data state P, the system will not perform a verify operation. For example, the memory system may apply a single program pulse without verification.

Prior to programming user data into a group of memory cells that group is erased. The erase process for cells that store user data will typically erase a large group of memory cells such as a block. Thus, the group that is erased may contain a large group of memory cells that contains many physical pages of memory cells. In an embodiment, an entire physical block of memory cells are erased together. However, in some cases only a portion of the physical block of memory cells are erased together. For example, only the upper tier of the block or only the lower tier of the block might be erased in the erase operation. The erase distribution (Er) for a physical page of memory cells is depicted in FIG. 5A. During an embodiment of erase, the Vt of the memory cells is verified with respect to an erase verify level (VeV). However, to pass erase it is not required that every memory cell have a Vt below VeV, as erase can pass so long as less than a pre-determined number of memory cells (or NAND strings) fail to pass erase verify.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In one embodiment of FIG. 5B, each memory cell stores three bits of data. Other embodiments may use other data capacities per memory cell (e.g., such as two, four, or five bits of data per memory cell).

FIG. 5B shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5B also shows a number of verify reference voltages. The verify reference voltages are VvA, VvB, VvC, VvD, VVE, VvF, and VvG. In one embodiment, the verify reference voltages VvA, VvB, VvC, VvD, VVE, VvF, and VvG are used when verifying memory cells. For example, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states.

In some embodiments, a bit-level erase is performed to maintain the bitmap. A bit-level erase is able to erase specific memory cells in group that is normally erased as a group, while inhibiting other cells in the group from being erased.

One approach to erasing memory cells is to generate gate-induced drain leakage (GIDL) current to charge up the NAND string channel. An erase enable voltage is applied to control gates of the memory cells, while maintaining the string channel potential to erase the memory cells. The GIDL current is generated by causing a drain-to-gate voltage at a select transistor (drain side and/or source side), in one embodiment. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel 465, thereby raising the potential of the channel 465. The other type of carriers, e.g., electrons, are extracted from the channel 465, in the direction of a bit line or in the direction of a source line, by an electric field. During erase, the holes may tunnel from the channel to a charge storage region 463 of memory cells and recombine with electrons there, to lower the threshold voltage of the memory cells.

FIG. 6 is a flowchart describing one embodiment of a process 600 for erasing memory cells. The process 600 may be used to erase an erase block of NAND memory cells. In one embodiment, the process 600 may be used to erase an entire physical block of NAND memory cells. In one embodiment, the process 600 may be used to erase a sub-block of the physical block of NAND memory cells. One type of sub-block are the sub-blocks selected by different drain side select lines such as in FIG. 4E. For example, the sub-block selected by SGDT0-s0, SGDT1-s0, SGD0-s0, and SGD1-s0 (more briefly referred to as SGD-s0) may be erased independent of the other four sub-blocks. Thus, in the example in FIG. 4E, there may be five sub-blocks selected by the respective SGDs. In an embodiment, system control logic 260 performs process 600 in response to a command from the memory controller 120. Process 600 describes a double sided erase in which an erase voltage (Vera) is applied at both ends of NAND strings (e.g., bit lines and source line). However, a single sided erase is also possible in which the erase voltage (Vera) is applied to only one end (e.g., bit line or source line) of the NAND strings. The steps of process 600 are described in a certain order to facilitate explanation. However, the steps could occur in a different order. Also, some of the steps may occur concurrently.

Step 602 includes setting an initial magnitude of an erase voltage (Vera). The initial Vera may have a relatively large magnitude such as, for example, 20V. Step 604 includes applying Vera to bit lines connected to the NAND strings in the erase block. Step 606 includes applying Vera to a source line connected to the NAND strings in the erase block. Step 606 is optional in that the erase could be a single sided erase in which Vera is provided only from the bit lines. In an alternative embodiment the Vera is provided only from the source line (not from the bit lines). Step 608 includes applying an erase enable voltage to the word lines in the erase block (e.g., the selected word lines connected to the selected memory cells). An erase enable voltage applied to a memory cell's control gate will enable erase of that cell if the erase voltage (e.g., Vera) is in the channel of that cell. In other words, the erase occurs as a result of the magnitude (and polarity) of the voltage between the control gate and the channel. In one embodiment, the erase enable voltage is 0V. Thus, a voltage of about 20V may occur between the channel and the control gate. Step 610 includes applying a voltage (herein referred to as a "GIDL voltage" or Vgidl) to select lines (e.g., SGD, SGS). The GIDL voltage allows Vera to pass to the NAND channels. The GIDL voltage has a suitable magnitude that, in combination with Vera, will generate a GIDL current. In an embodiment, GIDL current is generated at both the source end and the drain end of the NAND strings to pass the erase voltage to the channels of the memory cells. In an embodiment, GIDL current is generated at only one end of the NAND strings to pass the erase voltage to the channels of the memory cells. The GIDL current will be generated at the end of the NAND strings to which Vera is applied.

Thus, the erase of a memory cell includes applying an erase enable voltage (e.g., 0V) to the control gate of the memory cell while applying an erase voltage (e.g., about 20V) to a channel or body of the memory cell. An erase voltage is defined herein as a voltage applied to a channel or body of a memory cell that will erase the memory cell providing that the erase enable voltage is also applied to a control gate of that memory cell. A memory cell that has the erase voltage applied to its channel (body) may be inhibited from erase by applying an erase inhibit voltage to its control gate. An erase inhibit voltage (applied to a memory cell control gate) is defined herein as a voltage that will inhibit erase of a memory cell despite the erase voltage being applied to the channel (body) of that memory cell.

After steps 604-610 are performed, an erase verify may be performed in step 612. The erase verify may apply for example VeV (See FIG. 5B) to each data word line in the erase block. If all memory cells in the erase block on a given NAND string have a Vt below VeV then the NAND string will conduct a significant current. In some embodiments, if a NAND string passes erase of the NAND string may end at this point. Step 614 is a determination of whether erase is complete. If not the magnitude of the erase voltage (Vera) may optionally be increased in step 616. Thus, steps 604-614 are repeated. When all NAND strings have passed erase the process ends. In some embodiments, erase may end with a few NAND strings having yet to pass erase.

Figure 7:
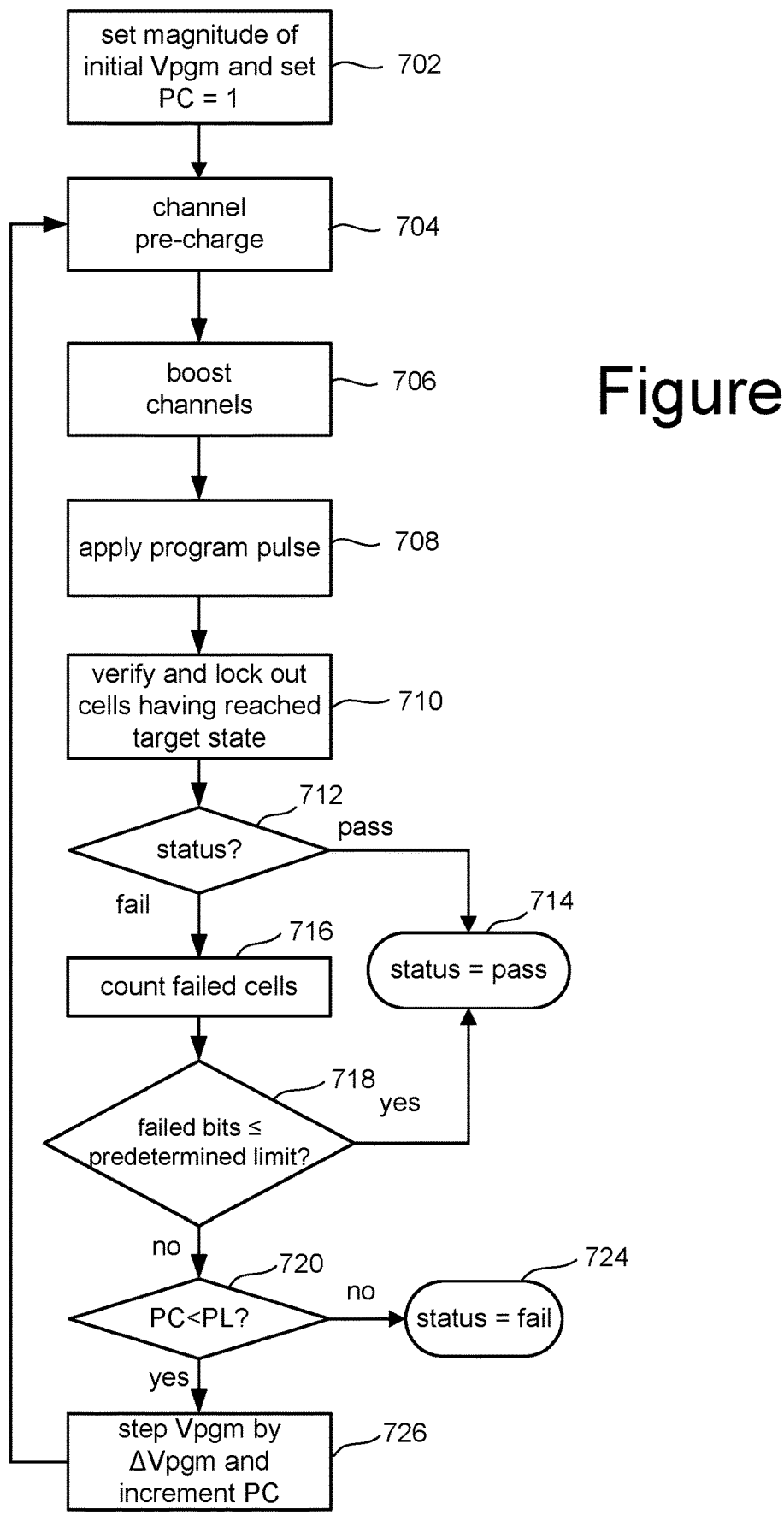
FIG. 7 is a flowchart describing one embodiment of a process for programming memory cells.

FIG. 7 is a flowchart describing one embodiment of a process for programming memory cells. For purposes of this document, the term program and programming are synonymous with write and writing. In one example embodiment, the process of FIG. 7 is performed for memory structure 202 using the one or more control circuits (e.g., system control logic 260, column control circuitry 210, row control circuitry 220) discussed above. In one example embodiment, the process of FIG. 7 is performed by integrated memory assembly 207 using the one or more control circuits (e.g., system control logic 260, column control circuitry 210, row control circuitry 220) of control die 211 to program memory cells on memory structure die 201. The process includes multiple loops, each of which includes a program phase and a verify phase. In one embodiment, the process is used to program user data into NAND memory cells. In one embodiment, the process is used for a bit-level program to maintain the bitmap.

Typically, the program voltage applied to the control gates (via a selected data word line) during a program operation is applied as a series of program pulses (e.g., voltage pulses). Between programming pulses are a set of verify pulses (e.g., voltage pulses) to perform verification. In many implementations, the magnitude of the program pulses is increased with each successive pulse by a predetermined step size. In step 702 of FIG. 7, the programming voltage signal (Vpgm) is initialized to the starting magnitude (e.g., ~12-16V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 704 the system will pre-charge channels of NAND strings that include memory cells connected to the selected word line that are to be inhibited from programming. In step 706, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled the unselected NAND string.

In step 708, a program voltage pulse of the programming voltage Vpgm is applied to the selected word line (the word line selected for programming). If a memory cell on a NAND string should be programmed, then the corresponding bit line is biased at a program enable voltage. In step 708, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 710, program verify is performed and memory cells that have reached their target states are locked out from further programming. Step 710 includes performing verification of programming by sensing at one or more verify reference levels. In one embodiment, the verification process is performed by testing whether the threshold voltages of the memory cells selected for programming have reached the appropriate verify reference voltage. In step 710, a memory cell may be locked out after the memory cell has been verified (by a test of the Vt) that the memory cell has reached its target state. For example, a memory cell may be locked out if it reaches a verify reference voltage. In one embodiment, one or more data latches in the managing circuit 330 are used to indicate whether a memory cell is locked out or is to receive full programming.

If, in step 712, it is determined that all of the memory cells have reached their target threshold voltages (pass), the programming process is complete and successful because all selected memory cells were programmed and verified to their target states. A status of "PASS" is reported in step 714. Otherwise if, in step 712, it is determined that not all of the memory cells have reached their target threshold voltages (fail), then the programming process continues to step 716.

In step 716, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 718, it is determined whether the count from step 716 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 714. In this situation when programming user data, enough memory cells programmed correctly such that the few remaining memory cells that have not been completely programmed can be corrected using ECC during the read process. In some embodiments, the predetermined limit used in step 718 is below the number of bits that can be corrected by error correction codes (ECC) during a read process to allow for future/additional errors. When programming fewer than all of the memory cells for a page, or comparing a count for only one data state (or less than all states), then the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria. However, for an embodiment in which the bitmap does not use ECC the predetermined limit may be set on other factors. Note that there may be multiple versions of the bitmap for data integrity purposes. Hence, even if there is a memory cell that will not program after an allotted number of program loops the system could allow the program of the bitmap to pass.

If the number of failed memory cells is not less than the predetermined limit, then the programming process continues at step 720 and the program counter PC is checked against the program limit value (PL). Examples of program limit values include 7, 12, 16, 19, 20 and 30; however, other values can be used. If the program counter PC is not less than the program limit value PL, then the program process is considered to have failed and a status of FAIL is reported in step 724. If the program counter PC is less than the program limit value PL, then the process continues at step 726 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts). After step 726, the process loops back to step 704 and another program pulse is applied to the selected word line so that another iteration (steps 704-826) of the programming process of FIG. 7 is performed.

FIG. 8 depicts one embodiment of a bitmap data structure 800. The bitmap data structure 800 in this example has four versions of the bitmap for an erase block. In this example, there is a first regular bitmap DA0 131a, a first one's complement bitmap ~DA0 131b, a second regular bitmap DA1 131c, and a second one's complement bitmap ~DA1 131d. Each bit in the first regular bitmap DA 131a may map to an address (e.g., PBA) in the erase block. For an embodiment of the first regular bitmap DA0 131a a value of "1" indicates valid data and a value of "0" indicates invalid data. Each of the other bitmaps ~DA0 131b, DA1 131c, and ~DA1 131d also contain n bits (B1, B2, . . . Bn−1, Bn) for the same addresses in the memory structure 202. The first one's complement bitmap ~DA0 131b has a value of "0" to indicate valid data and a value of "1" to indicate invalid data. Each bit in the second regular bitmap DA1 131c has the same value as the corresponding bit in the first regular bitmap DA0 131a. Each bit in the second one's complement bitmap ~DA1 131d has the same value as the corresponding bit in the first one's complement bitmap ~DA0 131b.

In the example in FIG. 8, the bitmap structure 800 has two copies of the regular bitmap DA0 131a, DA1 131c. The bitmap structure 800 may have more or fewer than two copies of the regular bitmap. The bitmap structure 800 is not required to have one's complement bitmaps. When the bitmap structure 800 has at least one one's complement bitmap, the bitmap structure 800 may have one or more copies of the one's complement bitmap.

In an embodiment, the bitmaps 131a, 131b, 131c, 131d are stored in non-volatile memory (e.g. NAND) as unencoded data. Note that user data is typically encoded as, for example, ECC codewords. Therefore, an ECC engine may be used to correct errors in encoded user data. In an embodiment, the memory system will compare a bit in DA0 with the corresponding bit in ~DA0 for data integrity. The memory system will expect the two bits to have complementary values. If the two bits do not have complementary (opposite) values then there is a data integrity issue. If there is a data integrity issue with DA0 and ~DA0, then the memory system may then examine two corresponding bits in DA1 and ~DA1 for data integrity. The structure 800 could have additional copies of the bitmap (e.g., DA2, ~DA2, DA3, ~DA3, etc.) to provide for additional data integrity checks.

In this example, the bits are B1, B2, . . . Bn−1, Bn. In one embodiment, these n bits map to different PBAs in an erase block. Each bit has a value (e.g., 0 or 1) that indicates whether the corresponding PBA has valid data. As one example, the value of n could be 13,080 if the erase block has 13,080 PBAs. In one embodiment, the number of PBAs is determined by the number of word lines, the number of sub-blocks, the number of pages of memory cells per word line, and the number of bits programmed into each memory cell. For example, there may be 218 WLs, five sub-blocks, four pages of memory cells per WL, and three bits per cell (218*5*4*3=13,080 PBAs per erase block). Each PBA could be, for example, 4K, 8K, 16K, etc.). Thus, the structure in FIG. 8 could contain, for example, 52,320 bits (13,080*4).

FIG. 9 depicts one embodiment of an organization of a block of bitmaps 900. FIG. 9 depicts how a group of bitmaps could be stored in a block of NAND memory cells in three-dimensional memory structure. The block has n+1 word lines (WL). The block is divided into five sub-blocks. The organization of five sub-blocks is consistent with the examples in FIG. 4B (see regions 420, 430, 440, 450, and 460) and FIG. 4E. In an embodiment, each sub-block is controlled by a different SGD, as has been discussed above in connection with FIG. 4E. The bitmaps for block (Blk) 0 and block 1 are stored in WL0, Sub-Block 0, the bitmaps for block 2 and block 3 are stored in WL0, Sub-Block 1, etc. In one embodiment, a read unit is one sub-block of a WL. Therefore, two bitmaps may be read with each read. However, depending on the size of the bitmaps more or fewer than two bitmaps could be stored/read for each read unit. Note also that the block could be divided into more or fewer than five sub-blocks.

FIG. 10 is a flowchart of one embodiment of a process 1000 of garbage collection based on a bitmap stored in non-volatile memory. The process 1000 may be performed by one or more control circuits in the memory system 100. Using non-volatile memory for the bitmap reduces the need for volatile memory such as RAM. Therefore, the memory system can have less volatile memory such as RAM thereby reducing cost. Step 1002 includes maintaining a bitmap in non-volatile memory. In one embodiment, the non-volatile memory is in a three-dimensional memory structure. In one embodiment, the non-volatile memory in which the bitmap is stored is NAND (e.g., 3D NAND). In one embodiment, the bitmap may contain valid/invalid status for an erase block in which case step 1002 may be repeated for other bitmaps that contain valid/invalid status for other erase blocks. Alternatively, the bitmap may contain valid/invalid status for many erase blocks. In one embodiment, step 1002 includes maintaining multiple versions of the bitmap (see, for example, FIG. 8).

Step 1004 includes performing garbage collection based on the bitmap. Step 1104 may include reading the bitmap (or portion thereof) to determine how may invalid data units are in an erase block. Step 1104 may include reading other bitmaps (or other portion thereof) to determine how may invalid data units are in other erase blocks. Erase blocks with high number of invalid data units may be identified for garbage collection. Then, the bitmap may be used to identify valid data units to move to a different erase block.

FIG. 11 is a flowchart of one embodiment of a process 1100 that includes maintaining a bitmap in non-volatile memory in response to writing user data. The process 1100 may be performed by one or more control circuits in the memory system 100. Step 1102 includes erasing a block having non-volatile memory cells, such as NAND cells. The block may be referred to as a main block (or user block) that may be used to store user data. The erase operation in step 1102 may be a standard erase operation that is performed on such main blocks to allow user data to be programmed therein.

Step 1104 includes writing a data unit to an address (e.g., PBA) in the block. This data unit is one of many data units that will be written to the main block. For the purpose of discussion, one data unit will be the focus in process 1100. However, the memory system could program more than one data unit at time. Note that this data unit may be associated with a logical address (e.g., LBA). For example, the host 102 may have requested that a unit of data be written for a logical block address (LBA). The memory controller 120 may maintain a table that maps the LBA to the PBA.

Steps 1106-1110 provide details for an embodiment of maintaining the bitmap. Steps 1106-1110 provide further details for one embodiment of step 1002 in FIG. 10. Steps 1106-1110 may be performed in the background. The dashed line between step 1104 and 1106 is meant to indicate that there could be a substantial gap in time between these two steps. Step 1106 includes performing a bit-level erase operation in the bitmap to indicate valid data at the address (e.g., PBA) in the block. Although step 1106 refers to one bit corresponding to the unit of data in step 1104, step 1106 may be performed after a number of units of data are programmed. Thus, step 1106 could erase a number of memory cells with the bit-level erase operation. However, some of the memory cells that store the bitmap will be inhibited from erase in step 1106 even though the bitmap is stored within an erase block.

Step 1108 includes a determination that the data at the address (e.g., PBA) is no longer valid. This determination may be made in response to the host 102 instructing the writing of new data for the LBA. The memory system may write the new data to a different PBA. Therefore, the data at the former PBA becomes invalid.

Step 1110 includes performing a bit level program operation in the bitmap to indicate invalid data for the address (e.g., PBA) in the block. Step 1110 may include programming a number of memory cells in the bitmap to indicate invalid data for the corresponding address while inhibiting programming of other cells in the bitmap.

Figure 12:
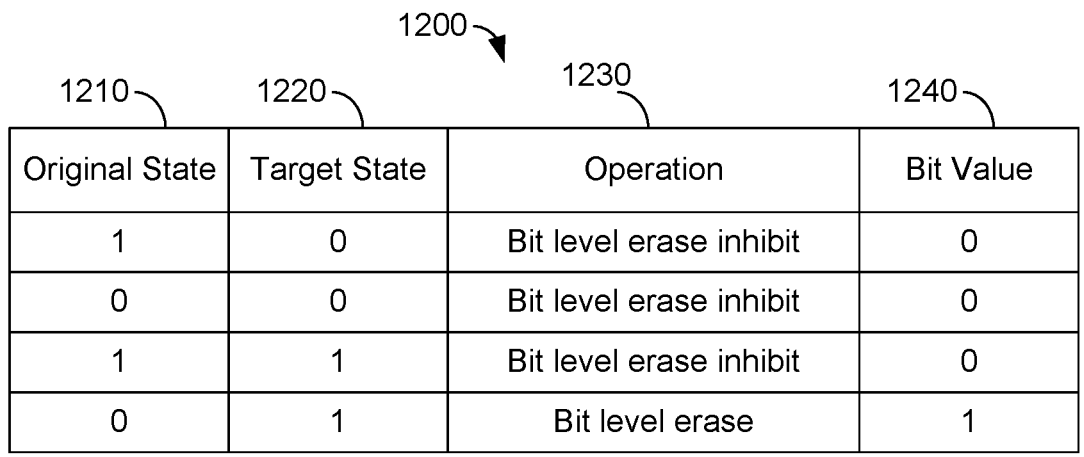
FIG. 12 depicts a table that provides details of one embodiment of a bit-level erase to maintain the bitmap.

FIG. 12 depicts a table 1200 that provides details of one embodiment of a bit-level erase to maintain the bitmap. Column 1210 indicates the original state of the cell. Column 1220 indicates the target state of the cell. Columns 1210 and 1220 may alternatively be interpreted as valid (1) or invalid (0) status for the data unit (e.g., PBA). Column 1230 indicates whether the memory cell is to be erased or inhibited from erase. Column 1240 indicates the bit value setting for the memory cell, which corresponds to whether the cell is to be erased or inhibited from erase. A value of "1" corresponds to erase and a value of "0" corresponds to inhibit erase. In an embodiment, only those cells to transition from the programmed state to the erase state are erased in the bit-level erase. All other cells are inhibited from erase. In an embodiment, the memory controller 120 sends a bit-level erase command to the memory die 200 (or control die 211). The bit-level erase command may contain a data patten for the erase by specifying the bit values of column 1240. In an embodiment, the bit-level erase is combined with a bit-level program to maintain the bitmap.

Figure 13:
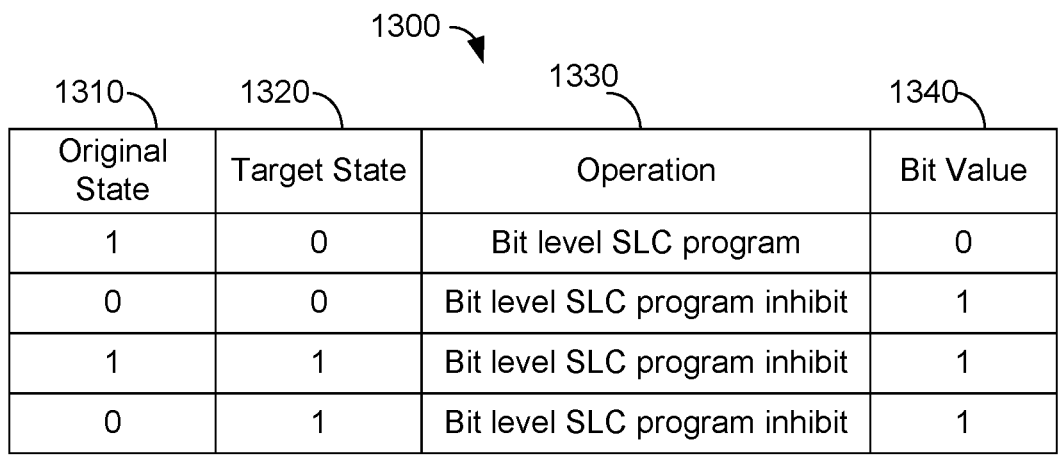
FIG. 13 depicts a table that provides details of one embodiment of a bit-level program to maintain the bitmap.

FIG. 13 depicts a table 1300 that provides details of one embodiment of a bit-level program to maintain the bitmap. Column 1310 indicates the original state of the cell. Column 1320 indicates the target state of the cell. Columns 1310 and 1320 may alternatively be interpreted as valid (1) or invalid (0) status for the data unit (e.g., PBA). Column 1330 indicates whether the memory cell is to be programmed or inhibited from programming. Column 1340 indicates the bit value setting for the memory cell, which corresponds to whether the cell is to be programmed or inhibited from program. A value of "0" corresponds to program and a value of "1" corresponds to the programmed inhibit. In an embodiment, only those cells to transition from the erase state to the program state are programmed in the bit-level program. All other cells in the bitmap may be inhibited from program. In an embodiment, the memory controller 120 sends a bit-level program command to the memory die 200 (or control die 211). The bit-level program command may contain a data patten for the program by specifying the bit values of column 1340. In an embodiment, the bit-level program is combined with a bit-level erase to maintain the bitmap.

Figure 14:
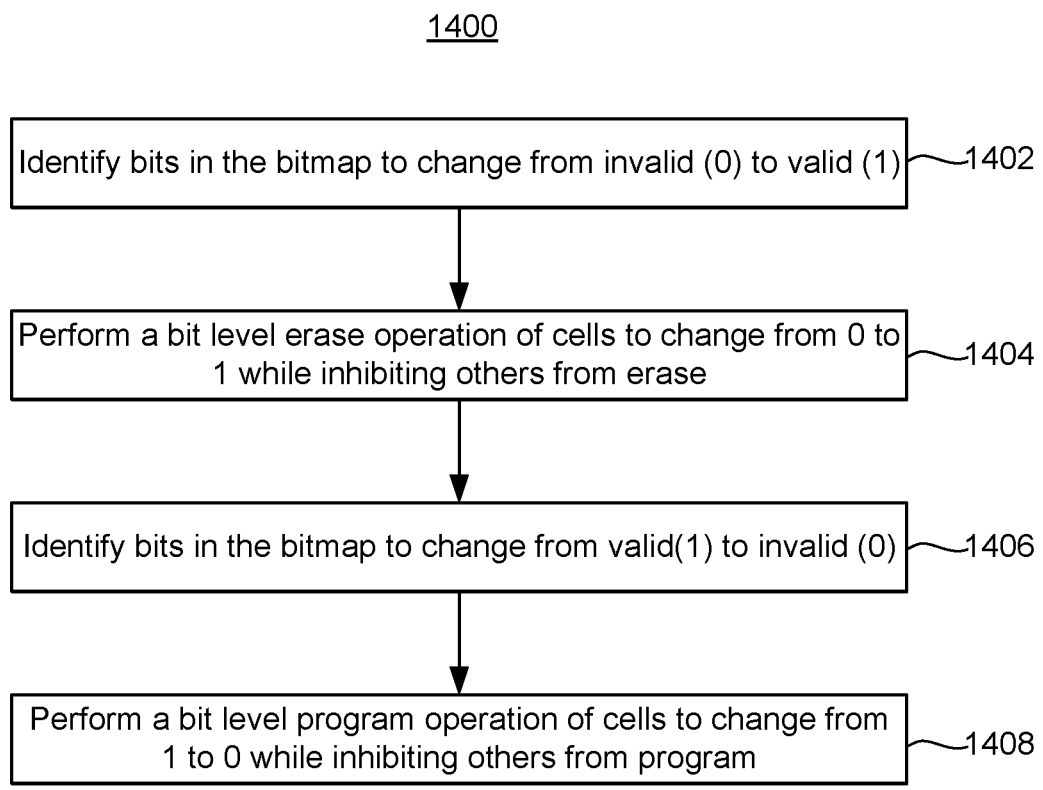
FIG. 14 is a flowchart of one embodiment of a process of maintaining the bitmap with bit-level memory operations.

FIG. 14 is a flowchart of one embodiment of a process 1400 of maintaining the bitmap with bit-level memory operations. The process 1400 may be performed in the background. This process may be performed by one or more control circuits in the memory system 100. The process 1400 will be discussed with reference to the tables 1200, 1300 in FIGS. 12 and 13. Step 1402 includes identifying bits in the bitmap to change from 0 (SLC programmed) to 1 (erased). In an embodiment, the memory controller 120 identifies these bits (or memory cells) based on recent writes to the non-volatile memory cells. In an embodiment, the memory controller identifies data unit to transition from invalid to valid. Step 1404 includes performing a bit-level erase operation of the cells that are to transition from 0 to 1 while inhibiting all other cells in the bitmap from erase. The memory controller 120 may send a bit-level erase command to the die (200, 211). The bit-level erase command may specify what cells to erase and what cells to inhibit from erase. An example command is: 60h-Address (5cyc)-Data in-YYh=>Busy(tERASE)→Ready. In this command sequence CMD 60-CMD YY combination, the address cycles are 5 cycles. In this data in portion, the input data '0' stands for erase inhibit cell and input data '1' stands for the cell to be erased. Step 1406 includes identifying bits in the bitmap to change from 1 to 0. In an embodiment, the memory controller 120 identifies these bits (or memory cells) based on recent writes to the non-volatile memory cells. In an embodiment, the memory controller identifies data unit to transition from valid to invalid. Step 1408 includes performing a bit-level program operation of the cells that are to transition from 1 to 0 while inhibiting all other cells in the bitmap from program. The memory controller 120 may send a bit-level program command to the die (200, 211). In an embodiment, the bit-level program command is similar to a regular program command such as a program command in the Open NAND Flash Interface (ONFI) Specification. In another embodiment, the bit-level program is performed prior to the bit-level erase. Note that process 1400 may be varied to maintain a one's complement bitmap.

Figure 15:
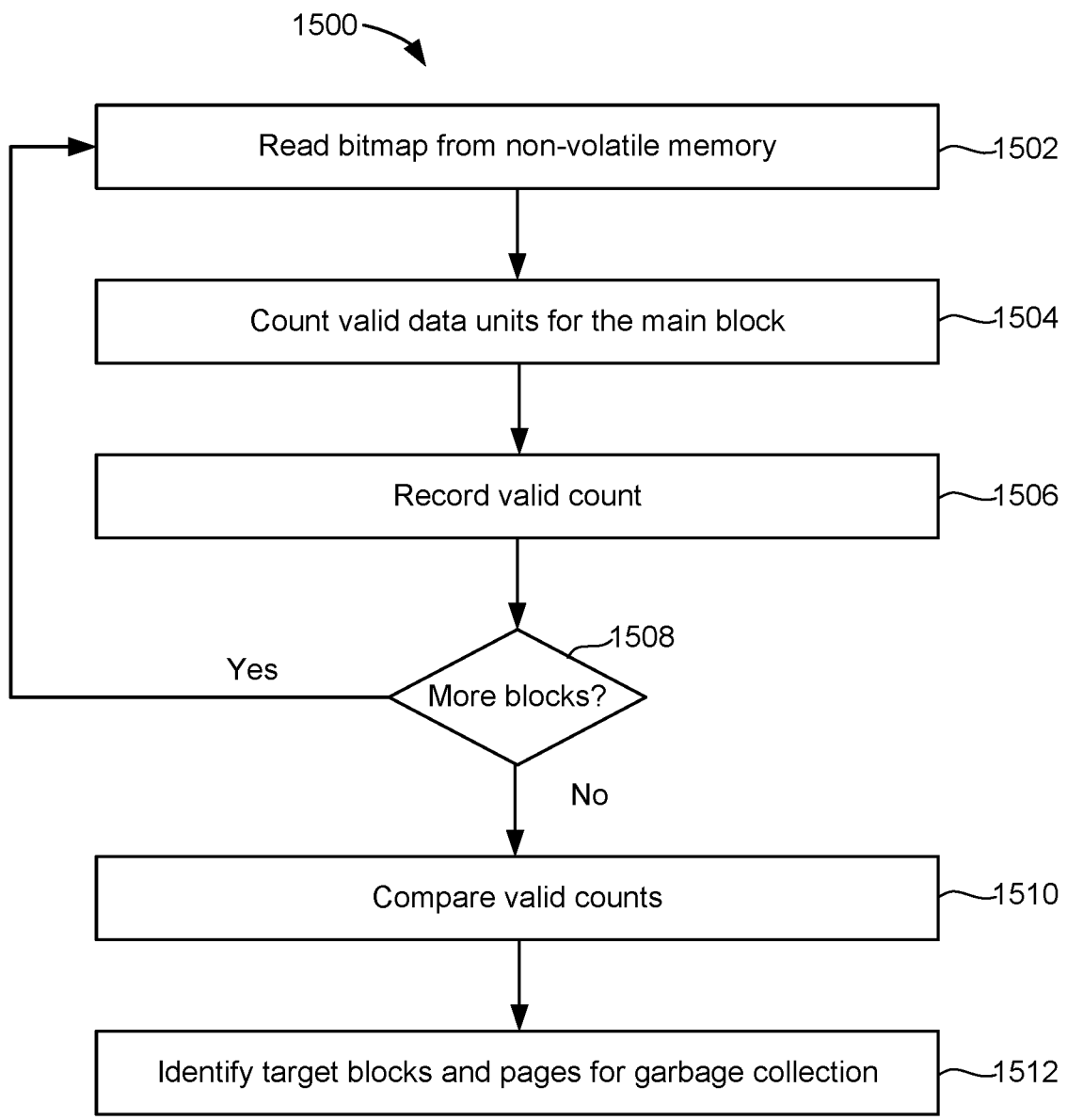
FIG. 15 is a flowchart of one embodiment of a process of identifying blocks for garbage collection based on a bitmap stored in non-volatile memory.

FIG. 15 is a flowchart of one embodiment of a process 1500 of identifying blocks for garbage collection based on a bitmap stored in non-volatile memory. Process 1500 may be used in one embodiment of step 1004 in FIG. 10. In process 1500 each bitmap corresponds to one main block of user data. Step 1502 includes reading a bitmap from non-volatile memory. In one embodiment, the bitmap is read from NAND memory cells. In one embodiment, the bitmap is read from memory cells in a three-dimensional memory structure. In one embodiment, one-sub-block of a word line is read, which could read one or more bitmaps (see FIG. 9). For the sake of discussion one bitmap will be discussed at this point. In an embodiment, the bitmap pertains to one main block. For example, the bitmap may contain a bit for each PBA in the main block.

Step 1504 includes counting valid data units for the main block. In an embodiment, sense amplifiers are used to determine whether each bitmap memory cell has a Vt above or below some reference value. With reference to FIG. 5A, a sense amplifier may be used to determine whether the Vt of a memory cell is above or below Vr. If the cell's Vt is above Vr then it is presumed to be in the programmed state (P). If the cell's Vt is below Vr then it is presumed to be in the erased state (E). In an embodiment, if this is a regular bitmap then the erased state corresponds to valid data and the programmed state corresponds to invalid data. In an embodiment, if this is a one's complement bitmap than the erased state corresponds to invalid data and the programmed state corresponds to valid data. In an embodiment, there is circuitry on either the memory die 200 or control die 211 that is able to count cells in either the erased state or the programmed state. This circuitry may be similar to circuitry that is used to count memory cells during a program verify operation. In an embodiment, there is circuitry on either the memory die 200 or control die 211 that is able to compare each bit in the regular bitmap with the corresponding bit in the one's complement bitmap to check for data integrity. As noted above, if there is a data integrity issue with a bit, then the circuitry may examine the corresponding bits in the bitmap copies (e.g., DA1, ~DA1).

Step 1506 includes recording the valid count. In one embodiment the valid count is recorded on the memory die 200. In one embodiment the valid count is recorded on the control die 211. In one embodiment, the valid count is made on either the memory die 200 or control die 211 and reported to the memory controller 120, which stores the valid count.

Step 1508 includes a determination of whether there are more main blocks to process. If so, the process returns to step 1502 to process the bitmap for another main block. Once valid counts are made for a desired number of main blocks, the process compares the value counts at step 1510. In one embodiment, the comparison of the valid counts is performed by circuitry on the memory die 200 or control die 211. In one embodiment, the comparison of the valid counts is performed by the memory controller 120.

Step 1512 includes identifying target blocks for garbage collection. The target blocks may be those having the lowest valid counts. Garbage collection may then be performed on the target blocks. Garbage collection may include moving the valid data in the target blocks to other blocks. After all valid data from a target block has been moved, the target block may be erased.

Figure 16:
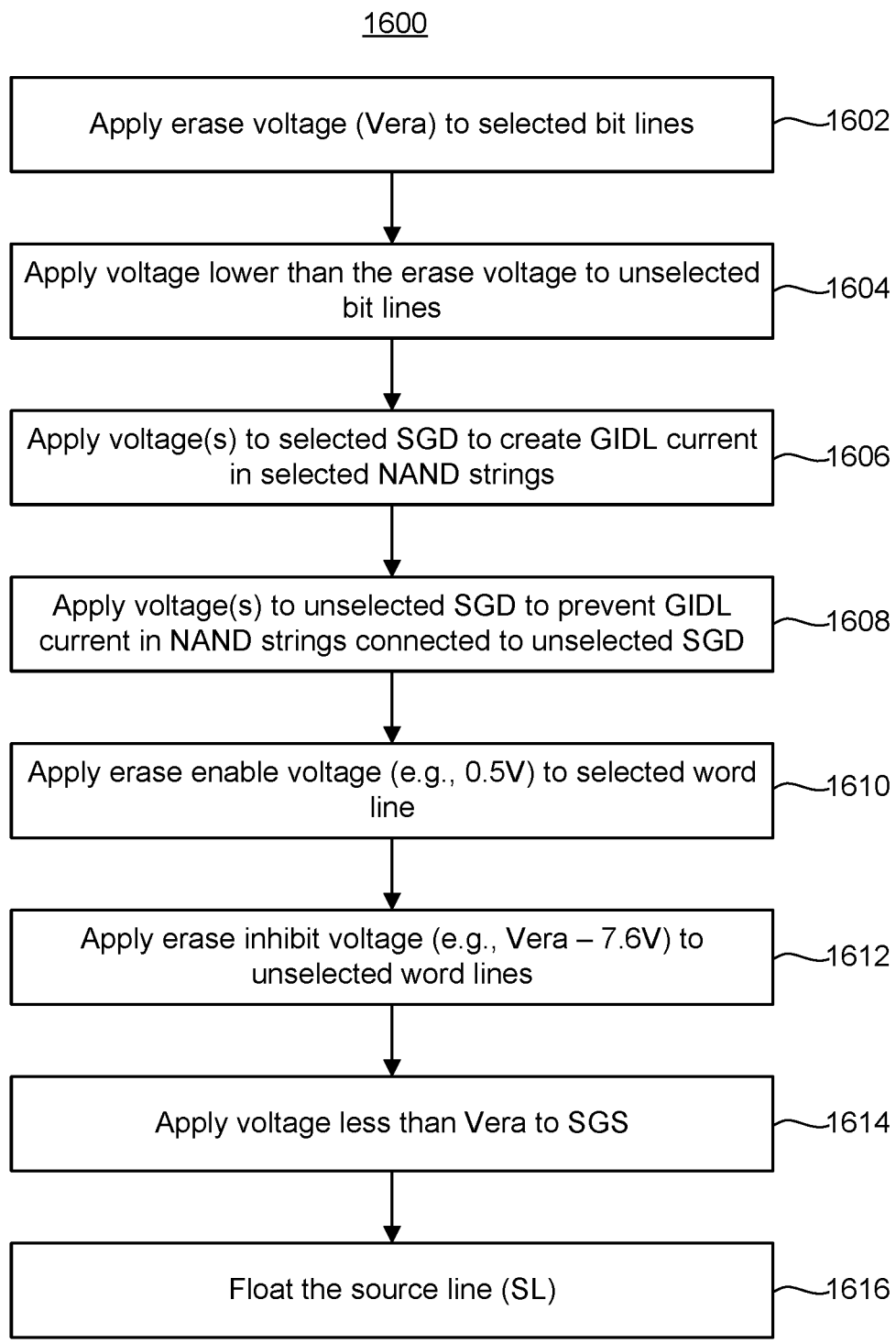
FIG. 16 is a flowchart of one embodiment of a process of bit-level erase in 3D NAND to maintain a bitmap.
Figure 17:
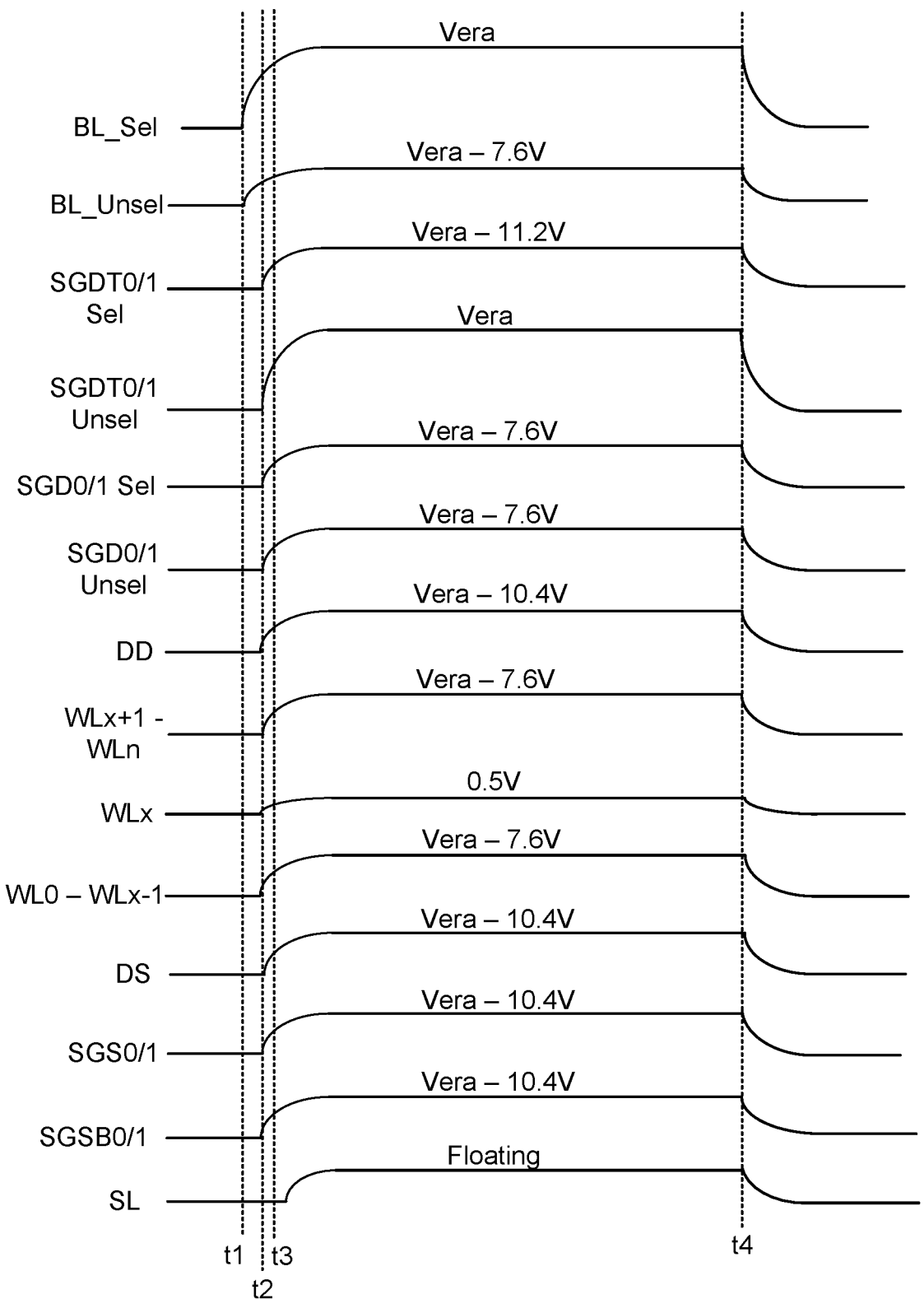
FIG. 17 is a timing diagram of voltages applied to the memory structure in one embodiment of a bit-level erase in 3D NAND to maintain a bitmap.

FIG. 16 is a flowchart of one embodiment of a process 1600 of bit-level erase in 3D NAND to maintain the bitmap. The process 1600 may be used in step 1106 of process 1100, and/or step 1404 in process 1400. The process 1600 could be performed by one or more control circuits, such as, but not limited to, system control logic 260 (including one or more of state machine 262, power control 264, interface 268), and/or column control circuitry 210, row control circuitry 220. In one embodiment, the memory controller 120 instructs the system control logic 260 to perform process 1600. FIG. 17 is a timing diagram of voltages applied to the memory structure in one embodiment of a FIG. 17 is a timing diagram of voltages applied to the memory structure in one embodiment bit-level erase in 3D NAND to maintain the bitmap. The bit-level erase is not limited to the voltages depicted in FIG. 17. The timing diagram will be referred to when describing process 1600. The steps of process 1600 may be performed in a different order than depicted in FIG. 16. Also some steps could be performed concurrently.

Step 1602 includes applying an erase voltage (Vera) to selected bit lines. A selected bit line in the bit-level erase is a bit line that is connected to a NAND string having a memory cell that is to receive the erase condition. The memory cells to receive the erase condition are connected to the selected word line (but not all memory cells connected to the selected word line will receive the erase condition). Step 1604 includes applying a voltage that is lower than the erase voltage to the unselected bit lines. An unselected bit line in the bit-level erase is a bit line that is connected to a NAND string for which all cells are to be inhibited from erase. FIG. 17 shows that at time t1 the voltage on the selected bit lines (BL_Sel) begins to increase to Vera. Also, at time t1 the voltage on the unselected bit lines (BL_Unsel) begins to increase to Vera−7.6.

Step 1606 includes applying voltage(s) to the selected SGD to create a GIDL current in the selected NAND strings (a selected NAND string is connected to a selected bit line and is also in the selected sub-block). With reference to FIG. 17, at t2 the voltage on SGDT0/1 Sel begins to increase to Vera−11.2V. Also, at t2 the voltage on SGD0/1 Sel begins to increase to Vera−7.6V. The combination of the voltages applied to the control gates of the selected SGD transistors and the selected bit lines will generate a GIDL current in the selected NAND strings. In this example, the SGD layers have four layers (see FIGS. 4C and 4E). In this example, Vera−11.2V is applied to the top two SGD lines (SGDT0, SGDT1). The next two lower SGD lines (SGD0, SGD1) each receive Vera−7.6V. In other embodiments, there will be a different number of SGD layers. Therefore, it will be understood by one of ordinary skill in the art that the generation of GIDL current is not limited to the example voltages in FIG. 17.

Step 1608 includes applying voltage(s) to the unselected SGD to prevent a GIDL current in the unselected NAND strings connected to the unselected SGD. Note that the NAND strings connected to the unselected SGD are in unselected sub-blocks. With reference to FIG. 17, at t2 the voltage on SGDT0/1 Unsel begins to increase to Vera. Also, at t2 the voltage on SGD0/1 Unsel begins to increase to Vera−7.6V. The combination of the voltages applied to the control gates of the unselected SGD transistors and either the selected bit lines or the unselected bit lines will not generate a GIDL current in the unselected NAND strings connected to the unselected SGD. For example, the drain to gate voltage difference between the voltage to and BL_sel and SGDT0/1 Unsel is given by: Vera−Vera=0V. The drain to gate voltage difference between the voltage to and BL_unsel and SGDT0/1 Unsel is given by: (Vera−7.6V)−Vera=−7.6V. Neither of these two conditions will create GIDL current in the unselected SGDT0/1. In one embodiment, the SGD layers have four layers (see FIGS. 4C and 4E). In this example, Vera is applied to the top two unselected SGD lines (SGDT0, SGDT1). The next two lower SGD lines (SGD0, SGD1) each receive Vera−7.6V. The voltages applied to the control gates of unselected SGD0, SGD1 will not generate GIDL current.

Additionally, unselected NAND strings that are connected to the selected SGD will be inhibited from erase. These unselected NAND strings are in the selected sub-block, but are connected to unselected bit lines. The combination of voltages applied to the unselected bit lines and the selected SGD will not generate a GIDL current in these unselected NAND strings. For example, the bit line to SGDT0/1 voltage for such NAND strings will be given by: (Vera−7.6V)−(Vera−11.2V)=3.8V. A drain to gate voltage of 3.8V will be too low to generate a GIDL current. Furthermore, the voltage applied to the selected SGD0/1 will not result in GIDL current for such unselected NAND strings.

Referring again to FIG. 16, step 1610 includes applying an erase enable voltage (e.g., 0V to 0.5V) to the selected word line (WLx). Step 1612 includes applying an erase inhibit voltage to the unselected word lines. Referring to FIG. 17 at t3, 0.5V is applied to WLx. Also, Vera−7.6V is applied to the unselected word lines (WLx+1 to WLn, and WL0 to WLx−1). Also, Vera−10.4V is applied to the dummy word lines (e.g., DD0, DD1, DS1, DS0).

The erase enable voltage (e.g., 0V to 0.5V) to the selected word line (WLx) will enable erase of selected memory cells, which may have a voltage of approximately Vera passed to their channels. Some of the unselected memory cells to be inhibited will have the erase enable voltage applied to their control gates. For example, a memory cell could be connected to the selected word line but also be on a NAND string connected to an unselected BL. Such an unselected memory cell will not have Vera passed to its channel (as a result of no GIDL generation for that unselected NAND string). The voltage across this memory cell will not be sufficient to erase the cell (or to program the cell). Some unselected memory cells will be on a selected NAND string, but will be connected to an unselected word line. Such cells may have a channel to control gate voltage of about: Vera−(Vera−7.6V)=7.6V. The channel to control gate voltage of 7.6V will not erase such as unselected memory cell.

Referring again to FIG. 16, step 1614 includes applying a voltage lower than Vera to SGS. Step 1616 includes floating the source line (SL). Referring to FIG. 17, the voltages to SGS0/1 and SGSB0/1 are both raised to Vera-10.4 V at t2. The source line voltage is floated at t3. At t4 the voltages on the various control lines are brought back down.

In view of the foregoing, an embodiment includes an apparatus one or more control circuits configured to communicate with a three-dimensional memory structure comprising non-volatile memory cells. The one or more control circuits configured to maintain a bitmap in the non-volatile memory cells. Bits in the bitmap map to addresses in the non-volatile memory cells. Each bit has either a first value to indicate that the corresponding address has valid data or a second value to indicate that the corresponding address does not have valid data. The one or more control circuits are configured to perform garbage collection based on the bitmap.

In a further embodiment, to maintain the bitmap the one or more control circuits are further configured to perform a bit-level erase operation on the non-volatile memory cells in the bitmap to update a particular bit in the bitmap responsive to a determination that data stored at the address to which the particular bit maps has changed in validity.

In a further embodiment, to maintain the bitmap the one or more control circuits are further configured to identify first non-volatile memory cells in the bitmap to change from an SLC (single level cell) programmed state to an erase state in order to change validity of data units stored at addresses to which the first non-volatile memory cells map. The one or more control circuits are configured to perform a bit-level erase operation on the first non-volatile memory cells in the bitmap to change from the SLC programmed state to the erase state while inhibiting all other memory cells in the bitmap from erase.

In a further embodiment, to maintain the bitmap the one or more control circuits are further configured to identify second non-volatile memory cells in the bitmap to change from the erase state to the programmed state in order to change validity of data units stored at addresses to which the second non-volatile memory cells map. The one or more control circuits are further configured to perform a bit-level program operation on the second non-volatile memory cells in the bitmap to change from the erase state to the programmed state while inhibiting all other memory cells in the bitmap from programming.

In a further embodiment, to perform garbage collection the one or more control circuits are further configured to determine whether respective non-volatile memory cells read for a portion of the bitmap corresponding to an erase block have a threshold voltage above or below a reference level. The one or more control circuits are further configured to determine a count of invalid data units in the erase block based on the threshold voltages of the respective non-volatile memory cells.

In a further embodiment, the apparatus comprises a memory structure die comprising the three-dimensional memory structure and a control die bonded to the memory structure die. The non-volatile memory cells are NAND memory cells. The control die comprises at least a portion of the one or more control circuits. The portion is configured to determine the count of invalid data units in the erase block based on the threshold voltages of the respective NAND memory cells.

In a further embodiment, the apparatus comprises a memory die comprising the three-dimensional memory structure. The non-volatile memory cells are NAND memory cells The memory die comprises at least a portion of the one or more control circuits. The portion is configured to determine the count of invalid data units in the erase block based on the threshold voltages of the respective NAND memory cells.

In a further embodiment, to maintain the bitmap the one or more control circuits are further configured to store a first version of the bitmap in a first group of NAND memory cells in the three-dimensional memory structure as unencoded data. The one or more control circuits are further configured to store a second version of the bitmap in a second group of NAND memory cells in the three-dimensional memory structure as unencoded data. The one or more control circuits are further configured to read a portion of the first version of the bitmap from the first group. The one or more control circuits are further configured to read a corresponding portion of the second version of the bitmap from the second. The one or more control circuits are further configured to compare bits in the first version with corresponding bits in the second version for consistency. And the one or more control circuits are further configured to use bits from a backup copy of the bitmap stored in a third group of NAND memory cells in the three-dimensional memory structure responsive to a determination of inconsistency between bits in the first version and second version.

In a further embodiment, the second version of the bitmap is a one's complement to the first version of the bitmap.

In a further embodiment, using the bits from the backup copy of the bitmap is performed by the one or more control circuits responsive to a failed status of a data integrity check of the backup copy with a complement of the backup copy of the bitmap.

One embodiment includes a method for managing NAND memory. The method comprises erasing an erase block in the NAND memory. The method comprises writing a unit of user data to a location in the erase block that is currently erased. The method comprises performing a first bit level memory operation to change a bit in a bitmap in the NAND memory from a first value to a second value responsive to the writing of the unit of the user data to the location in the erase block to indicate the unit of data stored at the location in the erase block is valid. The method comprises performing a second bit level operation to change the bit in the bitmap in the NAND memory from the second value to the first value responsive to a determination that the unit of data at the location in the erase block is no longer valid.

One embodiment includes a non-volatile storage system. The system comprises a three-dimensional memory structure comprising NAND memory cells organized as erase block. The system comprises one or more control circuits in communication with the three-dimensional memory structure. The one or more control circuits are configured to write a data unit to a location in an erase block in the NAND memory cells. The one or more control circuits are configured to perform a bit level erase operation to cause a bit in a bitmap in the NAND memory cells to have a first value responsive to the writing of the data unit to indicate the data unit is valid. The one or more control circuits are configured to perform a bit level SLC (single level cell) program operation to cause the bit in the bitmap in the NAND memory to have a second value responsive to a determination that the data unit is no longer valid.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   one or more control circuits configured to communicate with a three-dimensional memory structure comprising non-volatile memory cells, the one or more control circuits configured to:
   maintain a bitmap in the non-volatile memory cells, wherein bits in the bitmap map to addresses in the non-volatile memory cells, wherein each bit has either a first value to indicate that the corresponding address has valid data or a second value to indicate that the corresponding address does not have valid data, wherein maintaining the bitmap includes performing a bit-level erase operation on a first non-volatile memory cell in the bitmap to update a first bit in the bitmap to one of the first value or the second value responsive to a determination that data stored at a first address to which the first bit maps has changed in validity while inhibiting erase of a second non-volatile memory cell in the bitmap that is currently in an SLC (single-level cell) programmed state that represents the other of the first value or the second value, wherein inhibiting erase of the second non-volatile memory cell keeps validity status unchanged for data stored at a second address to which a second bit in the bitmap maps; and
   perform garbage collection based on the bitmap.

2. The apparatus of claim 1 wherein, to maintain the bitmap, the one or more control circuits are further configured to:
   identify first non-volatile memory cells in the bitmap to change from an SLC (single level cell) programmed state to an erase state in order to change validity of data units stored at addresses to which the first non-volatile memory cells map; and
   perform a bit-level erase operation on the first non-volatile memory cells in the bitmap to change from the SLC programmed state to the erase state while inhibiting all other memory cells in the bitmap from erase.

3. The apparatus of claim 2 wherein, to maintain the bitmap, the one or more control circuits are further configured to:
   identify second non-volatile memory cells in the bitmap to change from the erase state to the programmed state in order to change validity of data units stored at addresses to which the second non-volatile memory cells map; and
   perform a bit-level program operation on the second non-volatile memory cells in the bitmap to change from the erase state to the programmed state while inhibiting all other memory cells in the bitmap from programming.

4. The apparatus of claim 1 wherein, to perform garbage collection, the one or more control circuits are further configured to:
   determine whether respective non-volatile memory cells read for a portion of the bitmap corresponding to an erase block have a threshold voltage above or below a reference level; and
   determine a count of invalid data units in the erase block based on the threshold voltages of the respective non-volatile memory cells.

5. The apparatus of claim 4, wherein the apparatus comprises:
   a memory structure die comprising the three-dimensional memory structure, wherein the non-volatile memory cells are NAND memory cells; and
   a control die bonded to the memory structure die, wherein the control die comprises at least a portion of the one or more control circuits, the portion is configured to determine the count of invalid data units in the erase block based on the threshold voltages of the respective NAND memory cells.

6. The apparatus of claim 4, wherein the apparatus comprises:
   a memory die comprising the three-dimensional memory structure, wherein the non-volatile memory cells are NAND memory cells, wherein the memory die comprises at least a portion of the one or more control circuits, the portion is configured to determine the count of invalid data units in the erase block based on the threshold voltages of the respective NAND memory cells.

7. The apparatus of claim 1 wherein, to maintain the bitmap, the one or more control circuits are further configured to:
    store a first version of the bitmap in a first group of NAND memory cells in the three-dimensional memory structure as unencoded data; and
    store a second version of the bitmap in a second group of NAND memory cells in the three-dimensional memory structure as unencoded data;
    read a portion of the first version of the bitmap from the first group;
    read a corresponding portion of the second version of the bitmap from the second group;
    compare bits in the first version with corresponding bits in the second version for consistency; and
    use bits from a backup copy of the bitmap stored in a third group of NAND memory cells in the three-dimensional memory structure responsive to a determination of inconsistency between bits in the first version and second version.

8. The apparatus of claim 7, wherein:
    the second version of the bitmap is a one's complement to the first version of the bitmap.

9. The apparatus of claim 8, wherein using the bits from the backup copy of the bitmap is performed by the one or more control circuits responsive to a failed status of a data integrity check of the backup copy with a complement of the backup copy of the bitmap.

10. A method for managing a NAND memory, the method comprising:
    erasing an erase block in the NAND memory;
    writing a unit of user data to a location in the erase block that is currently erased;
    performing a first bit level memory operation to change a bit in a bitmap in the NAND memory from a first value to a second value responsive to the writing of the unit of the user data to the location in the erase block to indicate the unit of data stored at the location in the erase block is valid, including performing a bit-level erase to lower a threshold voltage of a first NAND memory cell in the bitmap that corresponds to the location in the erase block having the unit of valid user data while inhibiting erase of a second NAND memory cell in the bitmap that is currently in an SLC (single-level cell) programmed state and corresponds to another unit of data in the erase block that is not presently valid; and
    performing a second bit level operation to change the bit in the bitmap in the NAND memory from the second value to the first value responsive to a determination that the unit of data at the location in the erase block is no longer valid.

11. The method of claim 10, further comprising:
reading the bitmap from the NAND memory; and
performing garbage collection based on the bitmap.

12. The method of claim 10, wherein performing the second bit level operation to change the bit in the bitmap from the second value to the first value comprises:
performing a bit-level program to increase the threshold voltage of the first NAND memory cell while inhibiting program of a third NAND memory cell in the bitmap that is currently erased and corresponds to another unit of data in the erase block that is presently valid.

13. A non-volatile storage system, the system comprising:
a three-dimensional memory structure comprising NAND memory cells; and
one or more control circuits in communication with the three-dimensional memory structure, the one or more control circuits configured to:
    maintain a bitmap in the NAND memory cells, wherein bits in the bitmap map to addresses in the NAND memory cells, wherein each bit has either a first value to indicate that the corresponding address has valid data or a second value to indicate that the corresponding address does not have valid data, including:
        store a first version of the bitmap in a first group of the NAND memory cells in the three-dimensional memory structure as unencoded data;
        store a second version of the bitmap in a second group of the NAND memory cells in the three-dimensional memory structure as unencoded data;
        read a portion of the first version of the bitmap from the first group;
        read a corresponding portion of the second version of the bitmap from the second group;
        compare bits in the first version with corresponding bits in the second version for consistency; and
        use bits from a backup copy of the bitmap stored in a third group of the NAND memory cells in the three-dimensional memory structure responsive to a determination of inconsistency between bits in the first version and second version; and
    perform garbage collection based on the backup copy of the bitmap.

14. The non-volatile storage system of claim 13, wherein:
the second version of the bitmap is a one's complement to the first version of the bitmap.

15. The non-volatile storage system of claim 14, wherein using the bits from the backup copy of the bitmap is performed by the one or more control circuits responsive to a failed status of a data integrity check of the backup copy with a complement of the backup copy of the bitmap.

16. The non-volatile storage system of claim 13 wherein, to perform the garbage collection, the one or more control circuits are further configured to:
    determine whether respective non-volatile memory cells read for a portion of the backup copy of the bitmap corresponding to an erase block have a threshold voltage above or below a reference level; and
    determine a count of invalid data units in the erase block based on the threshold voltages of the respective non-volatile memory cells.

\* \* \* \* \*